United States Patent
Ichiyama

(10) Patent No.: US 6,456,458 B1
(45) Date of Patent: Sep. 24, 2002

(54) DISK-DRIVE MOTOR ROTATING ON A MAGNETICALLY COUNTERBALANCED SINGLE HYDRODYNAMIC THRUST BEARING

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/682,123

(22) Filed: Jul. 25, 2001

Related U.S. Application Data

(63) Continuation of application No. 09/369,156, filed on Aug. 6, 1999, now abandoned.

(30) Foreign Application Priority Data

| Aug. 8, 1998 | (JP) | .......... | 10-236468 |
| Aug. 9, 1998 | (JP) | .......... | 10-238021 |
| Oct. 2, 1998 | (JP) | .......... | 10-296156 |
| Oct. 21, 1998 | (JP) | .......... | 10-299457 |
| Jan. 21, 1999 | (JP) | .......... | 11-012660 |

(51) Int. Cl.[7] ............................. G11B 17/02
(52) U.S. Cl. ................................. 360/99.08
(58) Field of Search .......... 360/99.08, 99.04, 360/99.12, 99.05; 369/258, 268, 266, 264; 310/40 R, 46

(56) References Cited

U.S. PATENT DOCUMENTS

| 4,998,033 | A | * | 3/1991 | Hisabe et al. ........... 310/67 R |
| 5,096,309 | A | * | 3/1992 | Nakasugi et al. ........... 384/112 |
| 5,142,173 | A | * | 8/1992 | Konno et al. ........... 310/67 R |
| 5,223,758 | A | * | 6/1993 | Kataoka et al. ........... 310/90 |
| 5,273,368 | A | * | 12/1993 | Asada et al. ........... 384/113 |
| 5,457,588 | A | * | 10/1995 | Hattori et al. ........... 360/99.08 |
| 5,659,445 | A | * | 8/1997 | Yoshida et al. ........... 360/98.07 |
| 6,181,039 | B1 | * | 1/2001 | Kennedy et al. ........... 310/90 |
| 6,205,110 | B1 | * | 3/2001 | Miyamoto et al. ........... 369/266 |
| 6,252,319 | B1 | * | 6/2001 | Sudo et al. ........... 310/67 R |
| 6,307,293 | B1 | * | 10/2001 | Ichiyama ........... 310/90.5 |

* cited by examiner

Primary Examiner—Hoa T. Nguyen
Assistant Examiner—Julie Anne Watko
(74) Attorney, Agent, or Firm—James Judge

(57) ABSTRACT

Reduced axial height, compact disk-drive motor rotating on a hydrodynamic radial bearing and a magnetically counterbalanced single hydrodynamic thrust bearing. The single hydrodynamic thrust bearing is configured between the underside of the rotor hub and the adjacent end face of a support cylinder in which the motor shaft rotates. To make the motor rotationally operable, instead of another hydrodynamic thrust bearing, the reduced axial-height configuration employs magnetic counterbalancing means associated with the cylindrical wall of the rotor hub. The magnetic counterbalancing means counterbalances thrust hydrodynamic lifting pressure generated in the single thrust-hydrodynamic pressure bearing and acting on the rotor hub when it spins.

28 Claims, 18 Drawing Sheets

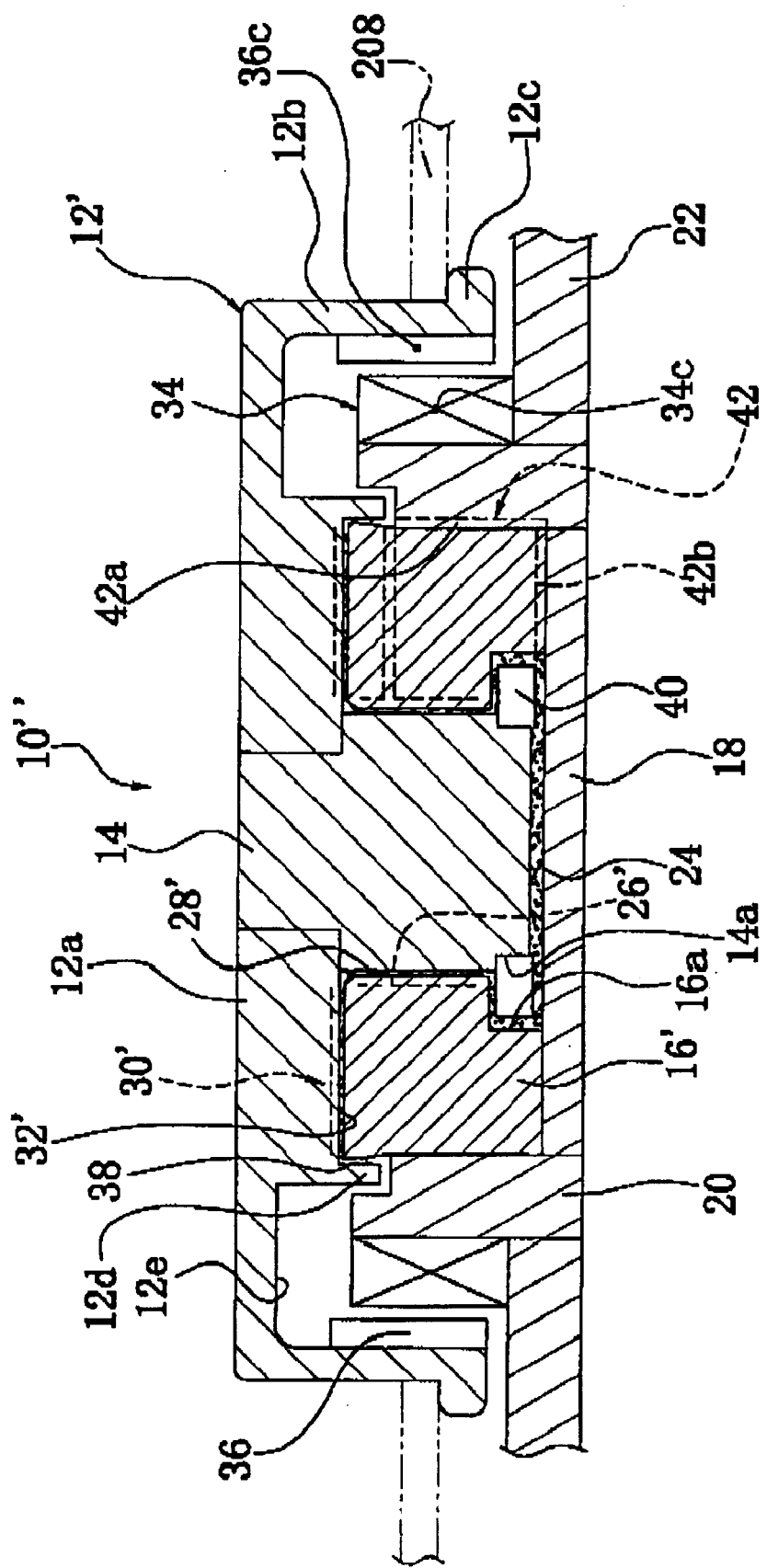

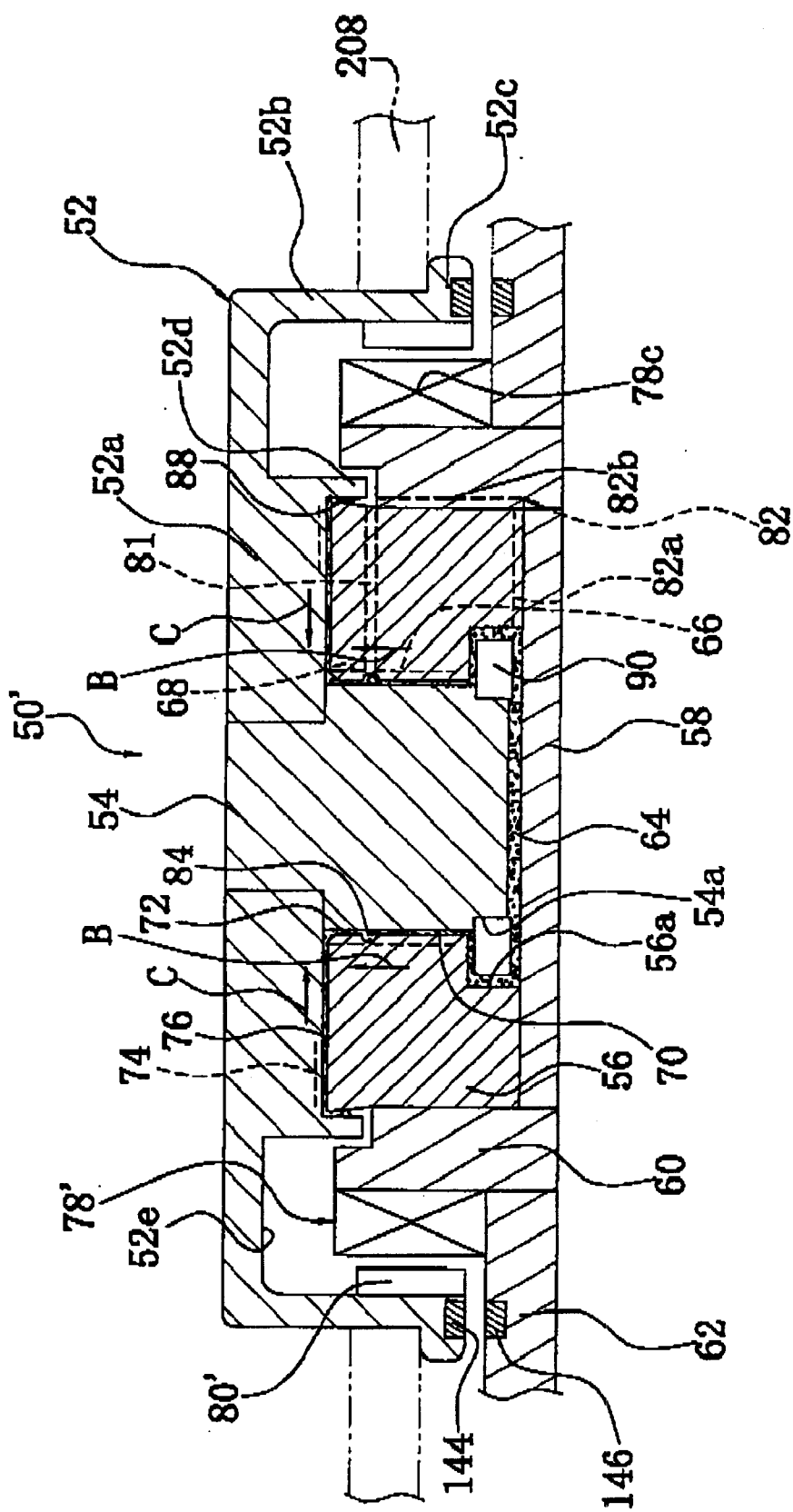

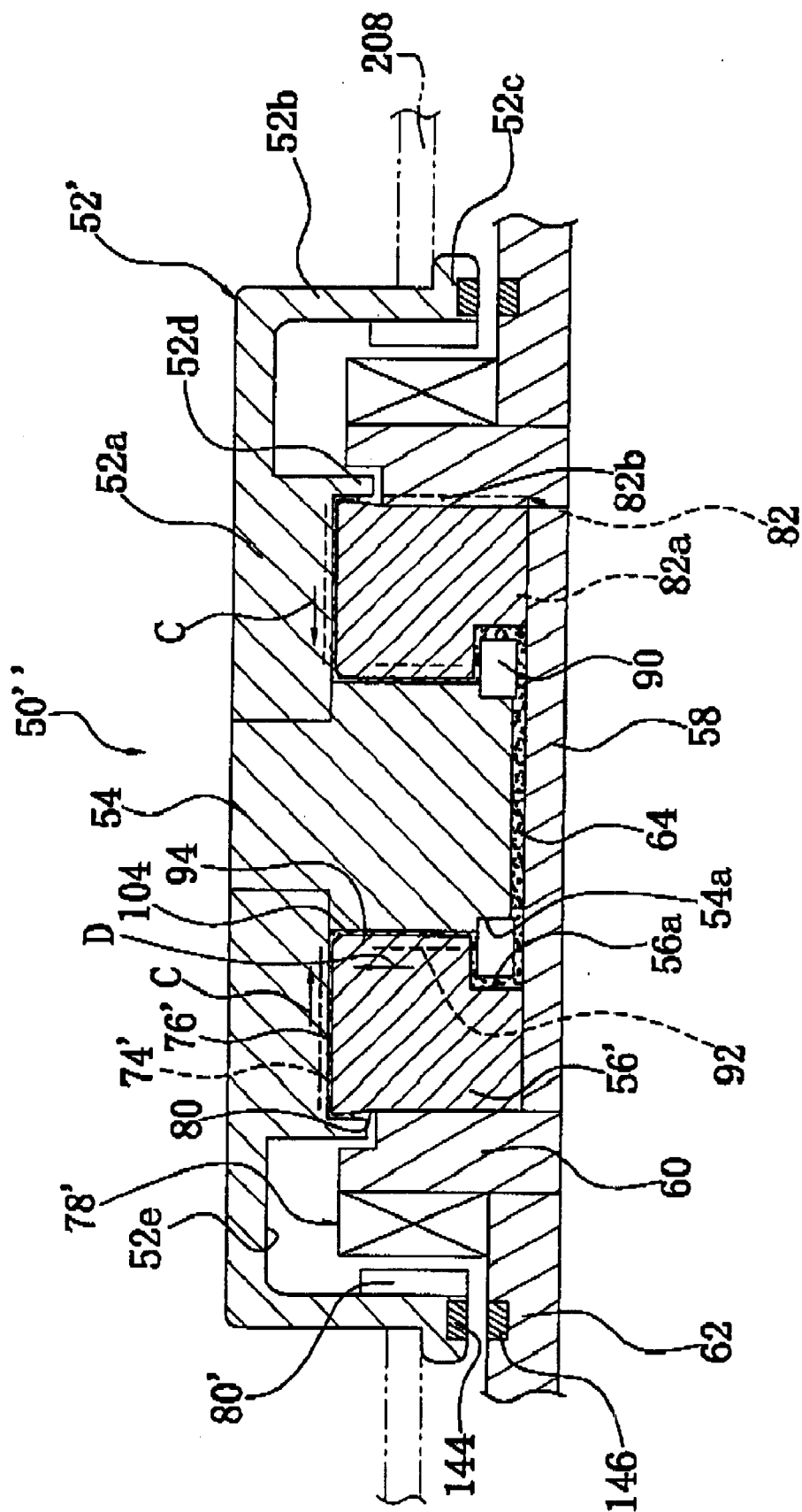

DISK-DRIVE MOTOR ROTATING ON A MAGNETICALLY COUNTERBALANCED SINGLE HYDRODYNAMIC THRUST BEARING

CROSS REFERENCE TO RELATED APPLICATIONS

This is a continuation of Application Ser. No. 09/369,156, filed Aug. 6, 1999 now abandoned.

BACKGROUND OF INVENTION

1. Technical Field

The present invention relates to spindle motors; in particular to disk-drive spindle motors employing hydrodynamic bearings that generate rotational dynamic pressure in shaft-sleeve interposed lubricant for rotationally bearing the disk-supporting shaft/sleeve.

2. Description of Related Art

Disk drive devices, such as computer hard disk drives, in which spindle motors are employed to drive data-storing disks, are well known. Spindle motors of this type may include hydrodynamic bearing configurations that generate bearing pressure in the lubricating fluid dynamically when the motor spins, thereby stabilizing, for example, a disk-supporting sleeve rotationally against a stationary spindle shaft.

One such motor is disclosed in U.S. Pat. No. 5,504,637. The disclosed motor includes a stationary shaft, a thrust plate fixed endwise to the stationary shaft, and a rotary hub having an annular central recess encompassing the thrust plate and integral with a sleeve surrounding the shaft. The motor further includes a thrust washer fixed over the central recess in the hub, confining the thrust plate in the rotary hub recess. Lubricant is retained in a clearance between the base of the recess and the axially adjacent surface of the thrust plate; the lubricant and the clearance-defining surfaces of the recess and thrust plate form a first hydrodynamic thrust bearing. Axially adjacent, clearance-defining surfaces of the thrust plate and thrust washer, together with lubricant retained in the clearance form a second hydrodynamic thrust bearing.

Herringbone grooves for generating hydrodynamic pressure are formed in a first portion of the cylindrical surface of the shaft. The first portion of the shaft cylindrical surface is surrounded by the radially adjacent inner circumferential surface of the sleeve at an annular micro-gap filled with lubricant. The grooved first portion of the shaft cylindrical surface, the adjacent inner surface of the sleeve, and the lubricant in the micro-gap establish a first radial bearing. Hydrodynamic-pressure-generating herringbone grooves are also formed in a second portion of the shaft cylindrical surface, radially adjacent the inner surface of the sleeve at another annular micro-gap filled with lubricant. The grooved second portion of the shaft cylindrical surface, the adjacent inner surface of the sleeve, and the lubricant in the micro-gap establish a second radial bearing. The hydrodynamic-pressure-generating grooves in the first and second radial bearings generate hydrodynamic pressure when the sleeve rotates relative to the shaft.

The hydrodynamic pressure thus generated in the radial bearings imparts high rigidity to the radial bearings to stabilize sleeve rotation. To stabilize sleeve rotation further, the first and second radial bearings are spaced apart at a predetermined distance, supporting the sleeve to eliminate wobble as it rotates about the shaft.

In a conventional motor of the foregoing type, the first and second radial bearings provide radial stability to the sleeve, maintaining the rotary hub in a vertical orientation with respect to the stationary shaft. Further, the first and second radial bearings maintain the sleeve in a concentric relationship with respect to the stationary shaft during rotation of the rotary hub. The effectiveness of the radial bearings in maintaining the rotary hub in a constant concentric relationship with respect to the shaft depends on the rigidity of each of the radial bearings and the axial distance between their respective centers. The farther apart the first and second radial bearings are, the more stable the rotary hub rotation will be against radial movement with respect to the shaft, since the thrust bearings primarily only restrain axial movement of the rotary hub.

Personal computers, in which disk-drive storage devices driven by conventional motors such as described above are utilized, are continually becoming smaller and thinner. The motors for spinning the hard disk in these disk-drive storage devices are expected to become smaller and thinner as well. Because the radial bearings are essential to the radial support of the rotary hub, however, and because making the distance between the radial bearings as large as possible is advantageous for imparting greater rotational stability to the rotary hub, reducing the axial height of motors employing first and second radial bearings presents difficulties.

Moreover, simply making motor structural components, such as the rotary hub and the thrust plate, thinner in order to reduce the motor axial height makes secure, precision assembly of the motor components to one another difficult. In particular, if the shaft and the thrust plate are not securely fixed to one another, the rotational precision of the motor is negatively affected.

Japanese laid patent application 08331796 (1996) discloses a different type of motor that includes a stationary sleeve encompassing a rotational shaft. In this case as well two axially separated sets of hydrodynamic-pressure-generating grooves are formed in the cylindrical surface of the shaft. The grooved sections of the shaft cylindrical surface and radially adjacent sections of the inner circumferential surface of the stationary sleeve define annular micro-gaps in which lubricant is retained, and together with the lubricant form upper and lower radial hydrodynamic bearings for supporting the rotational shaft.

However, the motor configuration disclosed in this Japanese publication does not utilize the radially extensive surface(s) of a thrust plate to establish hydrodynamic thrust bearing(s) as, in contrast, does the first motor configuration discussed above. Rather, hydrodynamic pressure generation grooves formed on the base-end surface of the shaft and/or the adjacent surface of a plate fixed to the sleeve, and lubricant in the clearance defined between the two surfaces, form a single hydrodynamic thrust bearing. Since the shaft is of diameter that is proportionately smaller than the thrust plate in the first motor discussed above, the grooves formed on the base-end surface of the shaft and/or the adjacent surface of the plate may not be able to generate sufficient thrust hydrodynamic pressure to support adequately the thrust load generated by rotation of the motor. Increasing the diameter of the shaft in order to obtain increased hydrodynamic pressure in the lubricant in the thrust bearing is not a practical consideration for this motor, because an increased shaft diameter in such a motor would result in greater energy loss that would decrease the electrical efficiency of the motor.

U.S. Pat. No. 5,659,445 to Yoshida et al. is directed to improving the lubricating configuration in a recording disk-drive motor. As set forth in the Summary section, Yoshida et al. accomplish this i) by employing tapered lubricant clearances in the thrust and radial dynamic-pressure bearing sections to increase dynamic lubricant pressure, and ii) by containing the dynamic pressure lubricant with a magnetic fluid seal device. Yoshida et al. thus seek to improve bearing and lubricating performance by increasing the dynamic pressure generated in, and at the same time keeping air out of, the radial and thrust bearing sections. The magnetic fluid seal device taught by Yoshida et al. is to prevent air, which has a larger coefficient of thermal expansion/contraction than the lubricant, from entering the bearing sections and destabilizing their performance.

Yoshida et al. thus teach improving motor bearing performance by employing tapered clearances to increase rotational dynamic pressure in the lubricant, which at the same time necessitates containing the lubricant with magnetic fluid seal devices. In turn, the magnetic fluid seal devices taught in every pertinent Yoshida et al. embodiment require a separate thrust plate/member for at least the thrust bearing on the rotor-hub adjacent end.

For example, Yoshida et al. discloses, as shown in FIG. 18, a recording-disk rotating device that includes a radial bearing portion 117 and thrust bearing portions 118 and 119. The radial bearing portion 117 is constituted by a combination of the inner circumferential surface of the circular hole in the bush 107 and helical or herringbone grooves 131 on the cylindrical surface of the shaft 105. The thrust bearing portions 118 and 119 are constituted by a combination of both the flat axial-end surfaces of the bush 107 and the respectively adjacent thrust plate 122 and thrust member 121, as well as tapered grooves 130 or spiral grooves 132.

Accordingly, the Yoshida et al. configuration employs dual thrust bearing portions 118 and 119. Consequently, bearing losses due, for instance, to fluid friction in the lubricant filling the clearances formed in both the thrust bearing portions 118 and 119 may be large, which lowers the electrical efficiency of the motor.

Furthermore, the necessity of the thrust plate/member in the recording disk rotating device as taught by Yoshida et al. significantly limits the amount by which the axial height can be reduced. For example, in the Yoshida et al. embodiment described above, the configuration of the thrust bearings 118 and 119 requires the thrust member 121 on the rotor hub 104 end of the shaft 105, and employs a thrust plate 122 as well. The magnetically conductive thrust member 121 is required to form a magnetic fluid seal device together with the magnet assembly 125.

Yoshida et al. employ tapered sections within the dynamic-pressure generating portions of the lubricant clearances to increase hydrodynamic pressure; thus instead of using taper seals along the lubricant boundaries to prevent leakage, special magnetic seals requiring at least one extra axially disposed part a thrust plate/member are used to magnetically seal a magnetic fluid as the dynamic-pressure generating lubricant in the thrust bearings.

The hydrodynamic bearings in the motor taught by Yoshida et al. are constituted by four components, namely: the shaft 105, the bush 107, the thrust member 121, and the thrust plate 122. Further, the hydrodynamic bearings include bearing gaps defined by six surfaces, namely: the outer circumferential surface of the shaft 105; the inner circumferential surface, and the axial upper and lower surfaces, of the bush 107; the axial lower surface of the thrust member 121; and the axial upper surface of the thrust plate 122.

In general, bearing surfaces that define hydrodynamic bearing gaps must be precisely machined to close tolerances, and the hydrodynamic bearing components must be precision-assembled, which makes hydrodynamic bearing manufacturing costs high. Accordingly, the number of bearing surfaces and parts desirably should be reduced to cut down motor manufacturing costs.

In view of the foregoing there exists a need for a spindle motor that overcomes the prior art problems mentioned above.

SUMMARY OF INVENTION

An object of the present invention is to reduce the axial height of and otherwise make smaller a spindle motor.

Another object is to facilitate the assembly of such a smaller and thinner spindle motor in order to minimize production costs.

Still another object is to configure a bearing structure for such a smaller and thinner spindle motor to provide the motor with a high level of rigidity.

Yet another object is to reduce the axial height of and make smaller a spindle motor by eliminating hydrodynamic bearing thrust plates entirely from the motor configuration, and yet to maintain thrust-load support in such a smaller and thinner spindle motor and make its manufacture and assembly simpler and less costly.

Another object of the present invention is to reduce the axial height of and otherwise make smaller a disk-drive device.

A further object is to facilitate and make less costly the assembly of such a smaller and thinner disk-drive device.

Still another object is to configure a bearing structure for such a smaller and thinner disk-drive device to provide the device with a high level of rigidity.

A yet further object is to reduce the axial height of and make smaller a disk-drive device by eliminating hydrodynamic bearing thrust plates entirely from the hydrodynamic thrust bearing configuration, to make manufacture and assembly of the disk-drive device simpler and less costly.

In accordance with one aspect of the present invention, a disk-drive motor is configured to rotate on a hydrodynamic radial bearing and a magnetically counterbalanced single hydrodynamic thrust bearing. The motor includes a support cylinder defining a central bore and a shaft coaxially inserted and extending at least partially into the support cylinder bore. An axially extending micro-gap is defined radially between the shaft circumferentially and the bore. A rotor hub is fixed axially endwise to the shaft, and the rotor hub itself constitutes a circular inner face opposing the support cylinder endwise. A radially extending micro-gap is defined axially between the circular inner face of the rotor hub and the end of the support cylinder. From the outer circumference of the rotor hub a cylindrical wall extends coaxially with the shaft, encompassing the stator, and a rotor magnet is fixed to the inner margin of the cylindrical wall, opposing the stator. Lubricant fills the axially and radially extending micro-gaps.

A radial-hydrodynamic pressure bearing including the lubricant-filled axially extending micro-gap, and hydrodynamic pressure-generating grooves formed in either the circumferential surface of the shaft or the bore, is thus established in this configuration. One single thrust-hydrodynamic pressure bearing including the lubricant-filled radially extending micro-gap, and hydrodynamic pressure-generating grooves formed in either the circular inner face of the rotor hub or the end of the shaft-support ring is also thus established in this configuration.

Further, magnetic counterbalancing means associated with the cylindrical wall of the rotor hub are provided for generating magnetically attractive force attracting the rotor hub axially toward the shaft-support ring. The magnetic counterbalancing means make the motor rotationally operable by counterbalancing thrust hydrodynamic lifting pressure acting on the rotor hub and generated in the single thrust-hydrodynamic pressure bearing when the rotor hub rotates.

Thus a spindle motor, as well as a disk-drive device employing the spindle motor, according to the present invention employs only one thrust bearing, defined between the lower surface of an upper wall section of the rotor hub, and the upper surface of the support cylinder. Therefore, because hydrodynamic thrust-bearing surface area is reduced over that in conventional motors, fluid friction due to the lubricant is reduced, improving the electrical efficiency of the motor. Moreover, since the only one hydrodynamic thrust bearing between the lower surface of the rotor hub and the upper wall portion of the support cylinder is formed without using a thrust plate, the axial height of the motor thus is reduced.

Moreover, in a disk-drive motor rotating on a hydrodynamic radial bearing and a magnetically counterbalanced single hydrodynamic thrust bearing according to the present invention, the underside surface of the rotor hub is employed in lieu of a thrust plate/member in configuring the lone hydrodynamic thrust bearing. Accordingly, in contrast to conventional disk-drive motor configurations, the end surface of the rotor hub itself is employed as a component of the hydrodynamic thrust bearing.

Three parts constitute the hydrodynamic bearings in a motor according to the present invention, namely: the rotor hub, the shaft, and the support cylinder. The hydrodynamic bearings include bearing gaps defined by four surfaces, namely: the lower surface of the rotor hub upper wall portion; the outer circumferential surface of the shaft; and the upper and the inner circumferential surfaces of the support cylinder. Therefore, motor configurations according to the present invention enable motor manufacturing costs to be reduced.

In sum, a disk-drive motor according to the present invention comprises one single hydrodynamic thrust bearing, configured between the underside of the rotor hub and the adjacent end face of the support cylinder. Configuring the motor to have unilaterally a lone thrust-hydrodynamic pressure bearing supporting the shaft necessitates counterbalancing means to achieve the axial balance essential to make the motor rotationally operable. Rather than another thrust-hydrodynamic pressure bearing, the reduced axial-height configuration according to the present invention employs the magnetic counterbalancing means.

Thus, no hydrodynamic thrust plates are employed in a spindle motor/disk-drive device embodied according to the present invention, and the motor/disk-drive device can be made smaller and reduced in axial height. Moreover, since hydrodynamic thrust plates must be manufactured within close tolerances and precise assembly techniques, the spindle motor of the present invention that lacks a hydrodynamic thrust plate entirely is easier to manufacture and assemble, thereby making the manufacturing process less costly. In the motor of the present invention, thrust loads are balanced by the single thrust bearing in combination with magnetic attraction whereby the single thrust bearing supports the rotor hub in a first axial direction and the magnetic attraction supports the rotor hub in a second axial direction.

A hard disk driving device according to the present invention utilizing the motor of the present invention described above, can be made thinner, smaller, less costly to manufacture, and capable of rotating a hard disk with precision.

From the following detailed description in conjunction with the accompanying drawings, the foregoing and other objects, features, aspects and advantages of the present invention will become readily apparent to those skilled in the art.

BRIEF DESCRIPTION OF DRAWINGS

FIG. 3A is a fragmentary, cross-sectional side view of the hard disk drive depicted in FIG. 1, on an enlarged scale, showing details of a motor having a rotor hub fixed to a rotational shaft and a motor housing having a stationary sleeve according to a third embodiment of the present invention;

FIG. 4D is a fragmentary, cross-sectional side view similar to FIG. 4A, showing details of a motor according to a sixth embodiment of the present invention;

FIG. 5D is a fragmentary, cross-sectional side view similar to FIG. 5A, showing details of a motor according to an eighth embodiment of the present invention.

DETAILED DESCRIPTION

Figure 1:
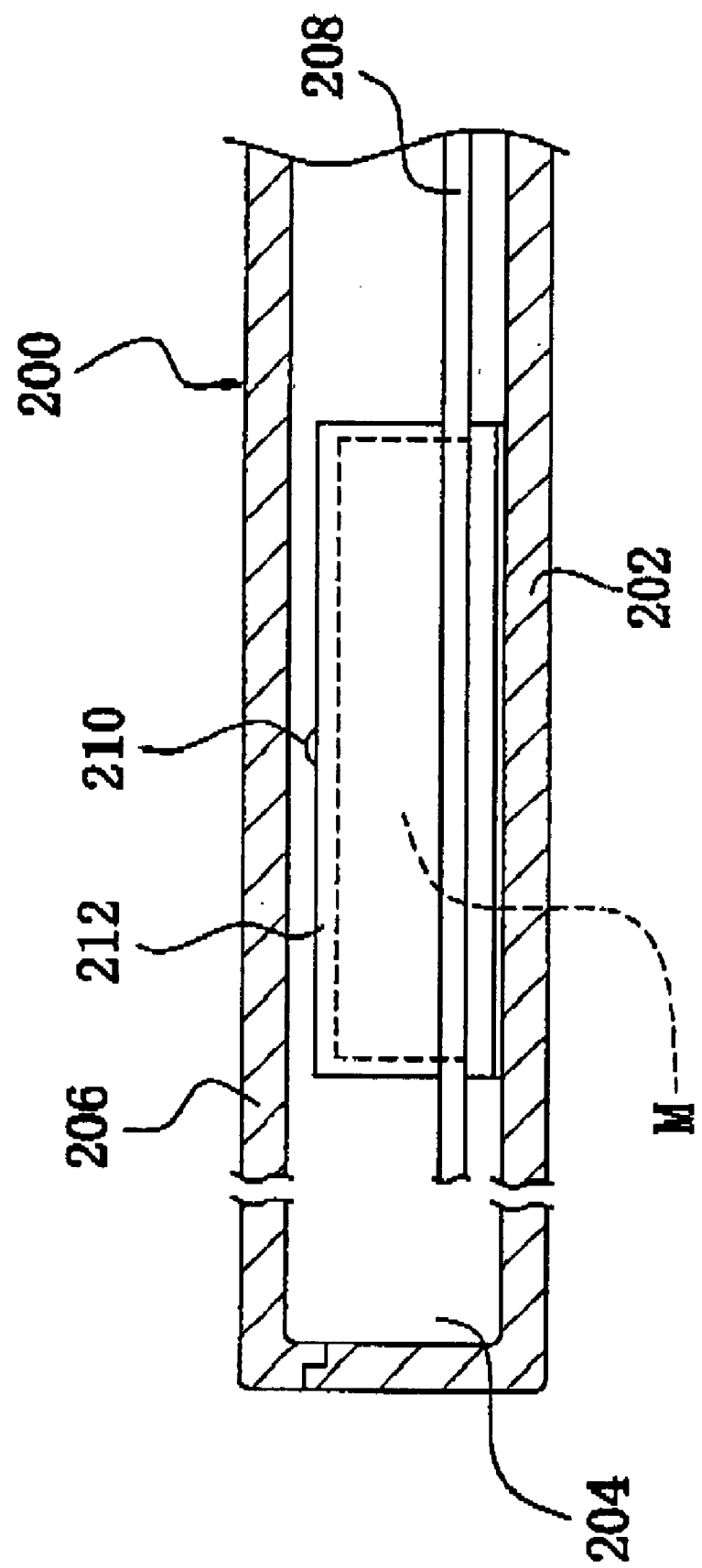
FIG. 1 is a fragmentary side view of a hard disk drive having a motor according to the present invention.

A motor for a hard disk drive device in accordance with several embodiments of the present invention are described in detail below with reference to the accompanying drawings. Specifically, FIG. 1 shows a hard disk drive for use in, for example, a computer system. The hard disk drive includes a housing 200, a hard disk 208, a motor M (described in greater detail below) and a clamp member 212. The housing 200 includes a base member 202 and an upper lid 206. The motor M is supported on the base member 202 and the hard disk 208 is supported by a rotor hub (described below) of the motor. The upper lid 206 along with the base member 202 covers and protects the motor and hard disk 208 by forming a sealed, dust free space 204. The clamp member 212 is fixed to the rotor hub of the motor M by a screw 210 for supporting the hard disk 208.

The motor M of the hard disk drive shown in FIG. 1, in accordance with the present invention, includes several embodiments that are described below. In the following description of the various embodiments of the motor M, reference is made to upper and lower portions of the various members. It should be understood that the directions upper and lower are relative to the orientation of the motor in, for instance, FIGS. 2A, 2D, 3A, 3D, 4A, 4D, 5A and 5D, and not to any specific orientation of the motor M since the motor of the present invention may be oriented in any of a variety of ways.

First Embodiment

FIGS. 2A, 2B, 2C and 2D show a first embodiment of the motor M. The first embodiment of the motor M is identified in FIG. 2A as a motor 10 that includes a rotor hub 12, a shaft 14, an annular support body 16, a disk-shaped cover 18, a supporting cylinder 20, a bracket 22, lubricant 24 such as lubricating oil, a radial bearing 28, a thrust bearing 32, a stator 34, and a rotor magnet 36, all described in greater detail below.

An overview of the structure of the motor 10 is described below. The bracket 22 of the motor 10 is fixedly attached to the base member 202 of the hard disk drive shown in FIG. 1. The supporting cylinder 20 partially extends into a central opening formed in the bracket 22 and the supporting cylinder 20 is fixed to bracket 22 by, for instance, adhesive and/or may be press fitted into the opening of the bracket 22. The annular support body 16 is fixed to the supporting cylinder 20 by, for instance, adhesive. The annular support body 16 is a hollow cylindrical member adapted to rotatably support the shaft 14 in a manner described in greater detail below. The cover 18 is fixed to the inner periphery of a lower end portion of the annular support body 16 by, for instance, adhesive and/or press fitting. The shaft 14 extends into a central opening formed in the annular support body 16. The rotor hub 12 is fixedly fitted to an upper portion of the shaft 14.

The rotor hub 12 includes a substantially disk-shaped upper wall portion 12a, a cylindrical side wall portion 12b, and a flange portion 12c. The cylindrical sidewall portion 12b extends in an axial direction from the outer periphery of the upper wall portion 12a toward the bracket 22. The flange portion 12c extends in a radially outward direction from a lower portion of the outer peripheral surface of the side wall portion 12b, thereby forming an annular lip that supports the hard disk 208 (depicted by phantom lines in FIG. 2).

An upper end of the shaft 14 is fixedly fitted into a central bore of the upper wall portion 12a of the rotor hub 12, whereby the shaft 14 rotates together with the rotor hub 12. The shaft 14 is fixed to the rotor hub 12 with an adhesive and/or by press fitting.

As is explained in greater detail below, lubricant 24 is retained by a capillary action in a small gap that extends between a lower surface of the upper wall portion 12a of the rotor hub 12 and an upper end surface of the annular support body 16. The small gap also extends between an inner peripheral surface of the annular support body 16 and an outer peripheral surface of the shaft 14, and further extends between a lower surface of the shaft 14 and an upper surface of the cover 18. The inner peripheral surface of the annular support body 16 is formed with herringbone grooves 26 (see FIG. 2C).

The herringbone grooves 26, a surrounding portion of the inner peripheral surface of the annular support body 16, and an adjacent portion of the outer peripheral surface of the shaft 14 form the radial bearing 28. In response to rotation of the shaft 14, the herringbone grooves 26 generates hydrodynamic pressure in the lubricant 24 in the radial bearing 28 to support loads in the radial direction, as is described further below.

Figure 2A:
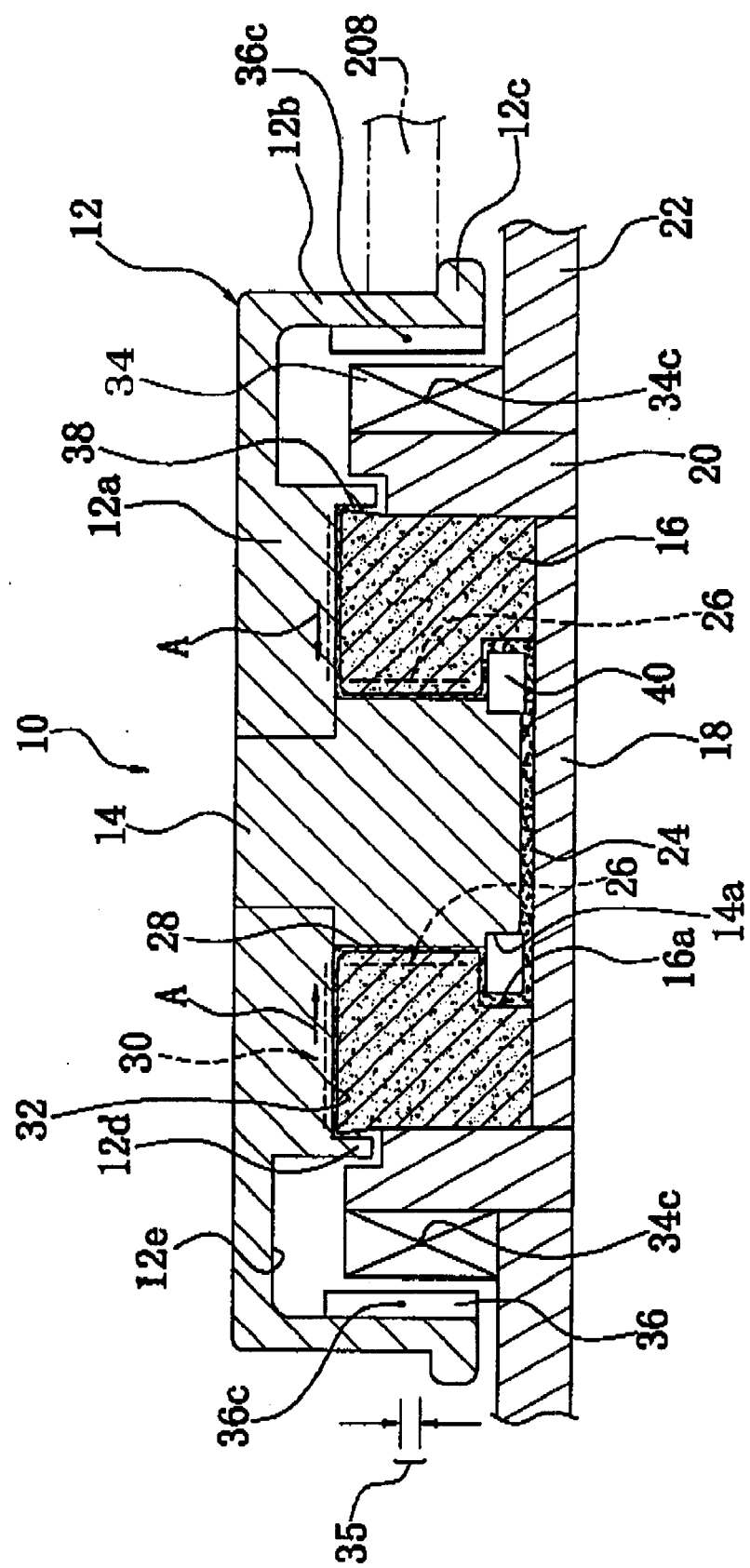
FIG. 2A is a fragmentary, cross-sectional side view of the hard disk drive depicted in FIG. 1, on an enlarged scale, showing details of a motor having a rotor hub fixed to a rotational shaft and a motor housing having a stationary sleeve according to a first embodiment of the present invention.
Figure 2B:
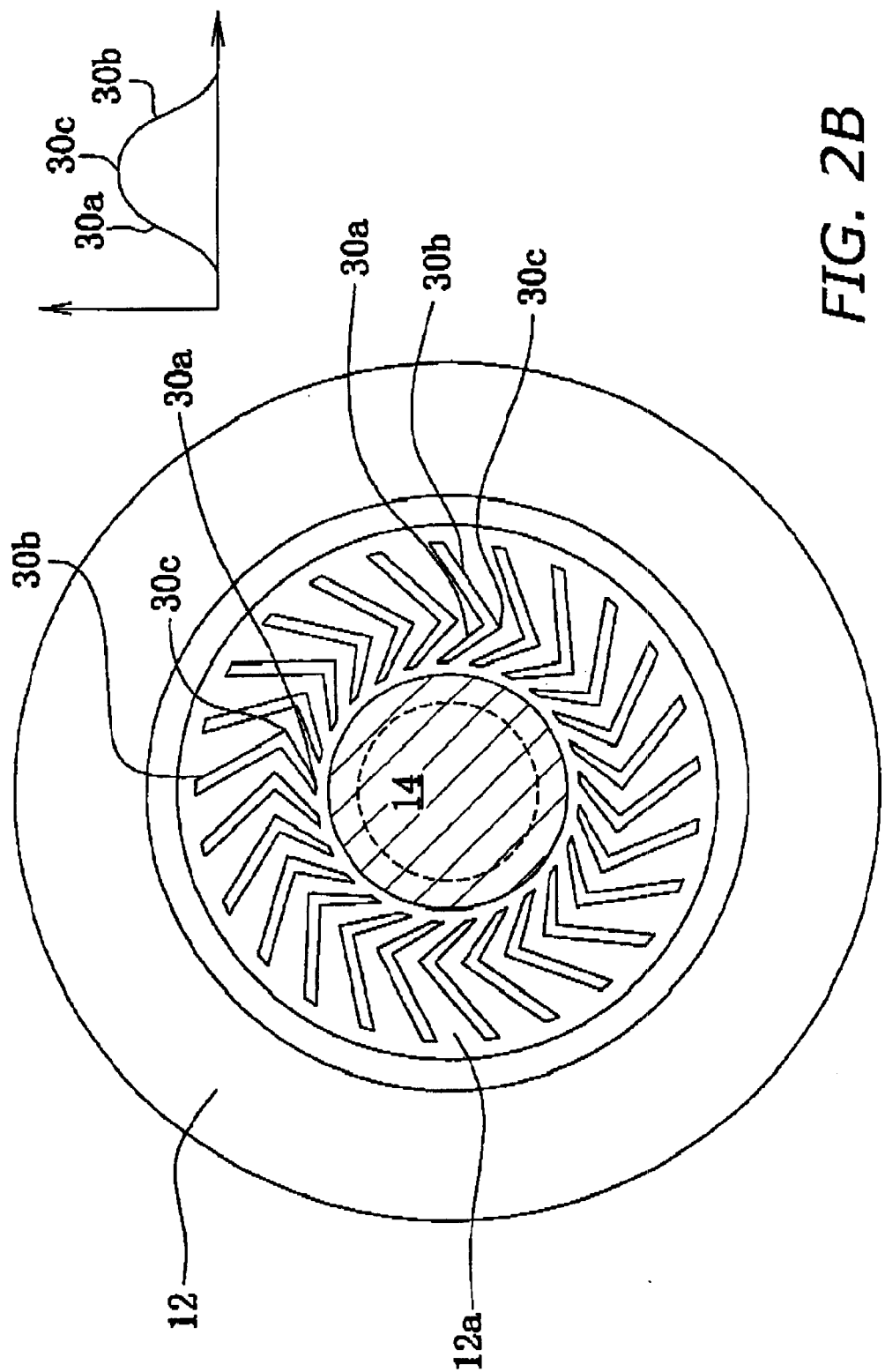
FIG. 2B is a bottom view of the rotor hub depicted in FIG. 2A showing hydrodynamic grooves formed on the rotor hub which in part form a thrust bearing of the motor.

The lower surface of the upper wall portion 12a is formed with herringbone grooves 30, shown in FIG. 2B, that together with the surrounding portions of the lower surface of the upper wall portion 12a of the rotor hub 12 and the adjacent portions of the upper end surface of the annular support body 16 form the thrust bearing 32. Upon rotation of the shaft 14 and rotor hub 12, the herringbone grooves 30 generate hydrodynamic pressure in the lubricant 24 in the thrust bearing 32 to support axial loads acting on the motor, as is described further below.

The stator 34 is fixed to an outer periphery of the supporting cylinder 20. The rotor magnet 36 is fixed to an inner peripheral surface of the side wall portion 12b of the rotor hub 12, such that the rotor magnet 36 cooperates with the stator 34 to cause rotation of the rotor hub 12 and the shaft 14 within the annular support body 16 and the cover 18. The stator 34 has a magnetic center 34c which corresponds to the center of magnetic forces of attraction of the stator 34. The rotor magnet 36 also has a magnetic center 36c which corresponds to the center of magnetic forces of attraction of the rotor magnet 36.

As is shown in FIG. 2A, the magnetic centers 34c and 36c are provided with an axial offset 35 in an axial direction with respect to the shaft 14 of the motor 10. The axial offset 35 is such that the rotor magnet 36 is urged axially downward toward the bracket 22 by the magnetic attraction between the rotor magnet 36 and stator 34. As a result of the magnetic attraction between the rotor magnet 36 and stator 34, the rotor hub 12 is acted upon by a downward force that acts against upward thrust forces. Consequently, the magnetic attraction between the rotor magnet 36 and stator 34 acts as a thrust bearing in a first axial direction. As is explained in greater detail below, hydrodynamic forces created by the herringbone grooves 30 of the thrust bearing 32 act in a second axial direction opposite the magnetic attraction forces between the stator 34 and the rotor magnet 36, thereby balancing axial or thrust forces in the motor 10.

The herringbone grooves 30 are shown more clearly in FIG. 2B. The herringbone grooves 30 include two sections, spiral grooves 30a and 30b that extend in opposite rotational directions. The spiral grooves 30a and 30b intersect at corner portions 30c that connect the spiral grooves 30a and 30b, whereby each of the herringbone grooves 30 has a shape of a letter V. In the herringbone grooves 30, the radially outer spiral grooves 30b are slightly longer than the radially inner spiral grooves 30a. In other words, the corner portions 30c are formed at radially inward positions with respect to a radial center of the thrust bearing 32. Therefore, as the rotor hub 12 and the shaft 14 rotate, the lubricant 24 is urged in a direction shown by an arrow A in FIG. 2 radially inward, thereby generating a dynamic pressure within the lubricant 24. Further, as indicated in FIG. 2B in the graph to the right of the rotor hub 12, the hydrodynamic pressure is greatest in the vicinity of the corner portion 30c due to the action of the spiral grooves 30a and 30b. It should be understood that although the spiral grooves 30a and 30b are depicted as having a generally straight configuration, the spiral grooves 30a and 30b also may have a curved or arcuate configuration. The maximum pressure generated by the grooves 30 in the vicinity of the corner portions 30c causes an upward force to act against the underside of rotor hub 12. This upward force is balanced by the downward oriented magnetic attraction between the stator 34 and the rotor magnet 36. These two forces together maintain the rotor hub 12 and shaft 14 axially positioned within the motor housing.

Figure 2C:
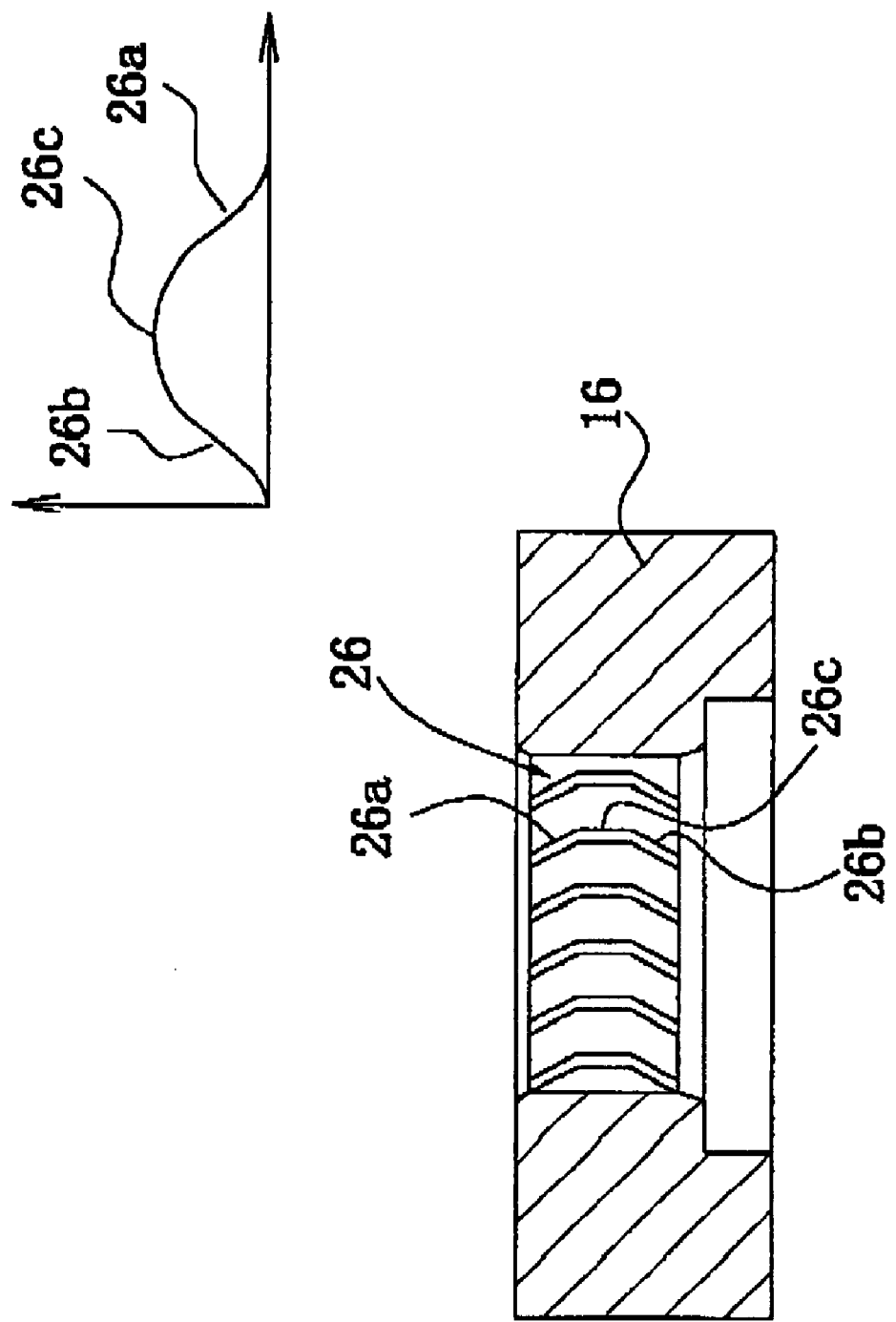
FIG. 2C is a cross-sectional side view of the stationary sleeve shown removed from the motor depicted in FIG. 2A, showing details of hydrodynamic grooves formed on an inner circumferentially extending surface of the sleeve.
Figure 2D:
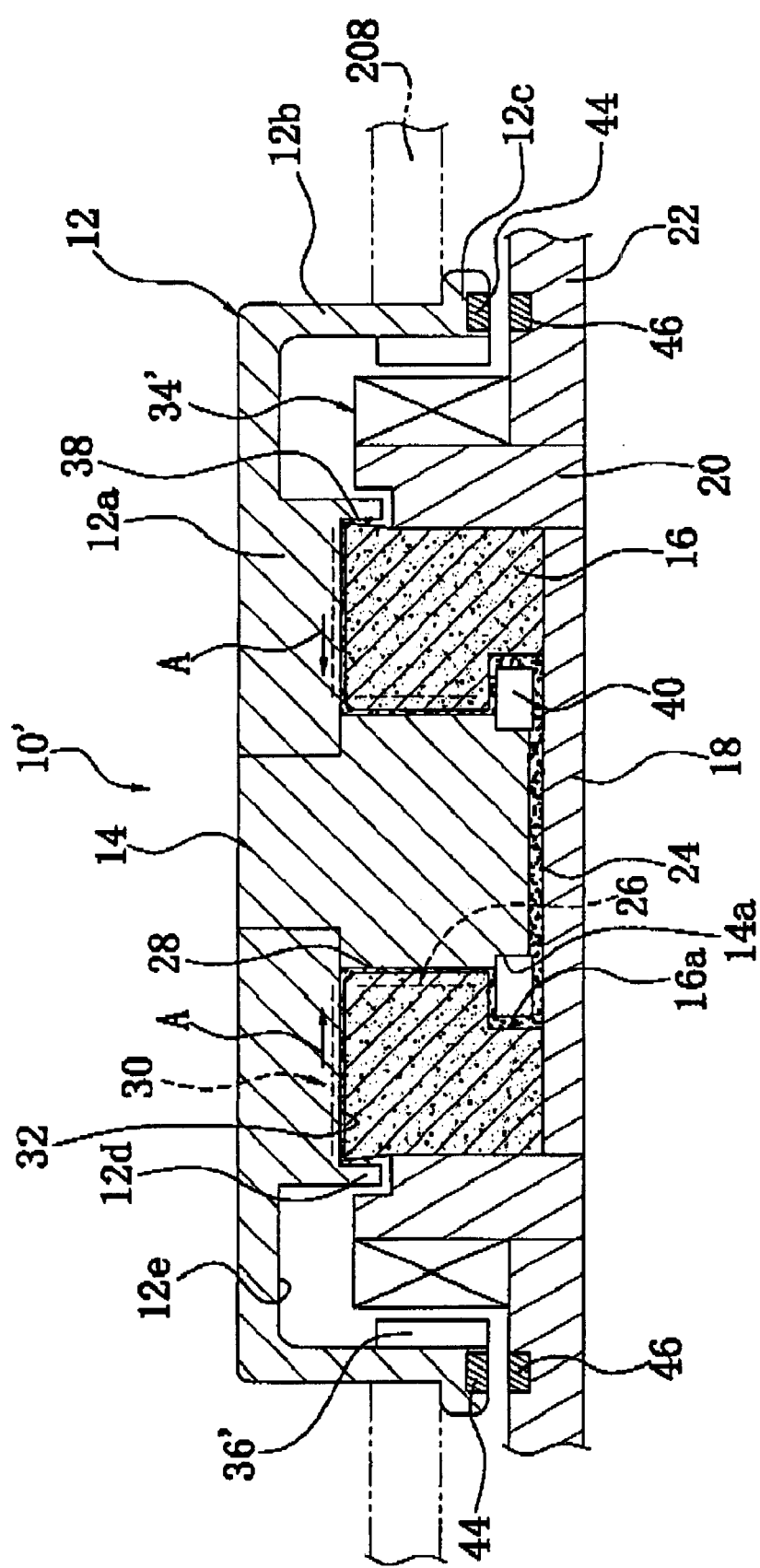
FIG. 2D is a fragmentary, cross-sectional side view similar to FIG. 2A, showing details of a motor according to a second embodiment of the present invention.

The herringbone grooves 26 of the radial bearing 28 include several portions such as spiral grooves 26a and 26b that extend in opposite rotational directions, and axial grooves 26c that connect the spiral grooves 26a to the spiral grooves 26b, as is more clearly shown in FIG. 2C. As the rotor hub 12 and the shaft 14 rotate, the lubricant 24 in the gap between the surfaces of the radial bearing 28 is urged toward the center of the axial grooves 26c from the spiral grooves 26a and 26b, thereby generating hydrodynamic pressure between the outer surface of the shaft 14 and the inner surface of the annular support body 16. As is indicated in the graph to the right of the support body 16 in FIG. 2C, the hydrodynamic pressure in the radial bearing is greatest along the length of the axial grooves 26c. The axial length of the maximum pressure area in the radial bearing 28 acts to support the shaft 14 to prevent wobble and other undesirable movement in radial directions.

The annular support body 16 is made of a porous material that absorbs and retains oil. For instance, the annular support body 16 is made of a sintered metal that is typically formed with pores and voids which can retain and hold liquid lubricant. The sintered metal may be formed by any of a variety of procedures and appropriate materials by, for instance, compression-molding powders of flake graphite cast iron, sintering the molded material, and thereafter impregnating the sintered material with lubricant.

It should be appreciated that the radial bearing 28 is exposed to the sealed, dust-free air within the housing 200 via the pores and voids in the oil-bearing metal that forms the annular support body 16. As a result, bubbles or vapor pressure that may develop in the lubricant 24 while the motor rotates can be vented to outside of the motor 10 through the pores and voids in the annular support body 16. As a result, the lubricant 24 generally does not leak out of the motor or bearings in the motor 10 because the porous nature of the annular support body 16 eliminates the possibility of vapor pressure building up due to an increase of temperature of the motor.

The upper surface of the annular support body 16 facing the herringbone grooves 30 and inner peripheral surface of the annular support body 16 surrounding the herringbone grooves 26 are treated with a sealant so that the pores and voids are filled up for preventing the lubricant 24 from penetrating into the bores of the annular support body 16. Specifically, hydrodynamic pressure created by the grooves 26 and 30 as the shaft 14 and rotor hub 16 rotate is only generated if the lubricant 24 has a sealed surface to act against. Therefore, the pores and voids formed in the vicinity of the herringbone grooves 26 and 30 must be filled in or sealed in order for the radial bearing 28 and thrust bearing 32 to operate properly.

The pores and voids on the upper surface of the annular support body 16 facing the herringbone grooves 30 and inner peripheral surface of the annular support body 16 surrounding the herringbone grooves 26 are sealed with any of a variety of sealing materials that withstand both the heat and temperature requirements of the motor 10. As a result of the inclusion of the sealing material on the upper surface of the annular support body 16 and inner peripheral surface of the annular support body 16 surrounding the herringbone grooves 26, lubricant 24 is retained in the annular support body 16, hydrodynamic pressure generated in the radial bearing 28 and the thrust bearing 32, and the hydrodynamic pressure can be used to support the shaft 14 and rotor hub 16. Alternatively, the pores and voids of the upper surface of the annular support body 16 and inner peripheral su race of the annular support body 16 can be filled in and covered by coating or plating.

An annular projection 12d is formed on the lower surface of the upper wall portion 12a of the rotor hub 12. The annular projection 12d extends downward with respect to FIG. 2A part way down an outer peripheral surface of the annular support body 16 for forming a gap therebetween. An inner peripheral surface of the annular projection 12d is therefore adjacent to a portion of the outer peripheral surface of the annular support body 16 thereby forming a tapered sealing portion 38 that retains the lubricant 24 on an outer peripheral side of the thrust bearing 32. An upper edge of the outer peripheral surface of the annular support body 16 adjacent to the annular projection 12d is radially outwardly inclined such that the gap between the annular projection 12d and the annular support body 16 becomes larger as the annular projection 12d extends downward. Surface tension on the lubricant 24 is in balance with atmospheric pressure of the surrounding air, forming a meniscus, which along with capillary action in the gap, retains the lubricant 24 in the thrust bearing 32.

Alternatively, the tapered sealing portion 38 can also have a structure in which radially outward edge of the upper surface of the annular support body 16 is inclined downward such that a meniscus if formed by the inclined surface adjacent to a radially outward edge of the thrust bearing 32.

To further prevent the lubricant 24 from leaking out of the thrust bearing through the inner peripheral surface of the annular projection 12d or the outer peripheral surface of the annular support body 16, which is generally known as an oil migration phenomenon, it is preferable that an oil repellent material such as a fluorine material is applied to the inner peripheral surface of the annular projection 12d and the outer peripheral surface of the annular support body 16 in the region of the tapered sealing portion 38.

An annular recess 14a is formed on an axial lower portion of the shaft 14. A ring member 40 is fixed to the annular recess 14a such that the ring member 40 projects radially outward from the outer peripheral surface of the shaft 14. An annular recess 16a is formed on the inner peripheral surface of a lower end of the annular support body 16 such that the ring member 40 extends into the annular recess 16a without contacting the annular support body 16. As is shown in FIG. 2A, a gap is formed between the adjacent surfaces of the annular recess 16a and the ring member 40, and the gap further continues between a portion of the upper surface of the cover and the lower surface the ring member 40. The gap between the cover 18, the annular recess 16a and the ring member 40 does not generally act as a bearing since no herringbone grooves are present to create hydrodynamic pressure. Rather, the ring member 40 and the annular recess 16a prevent the shaft 14 from slipping out of the rotor hub 12 when the motor is at rest (not rotating). By forming a structure to keep the shaft 14 from slipping out of the annular support body 16, axial vibrations of the rotor hub 12 can be reduced. Even when the motor receives a shock or impact, the movements of the rotor hub 12 are limited by the ring member 40 and the annular recess 16a such that the hard disk 208 that is mounted on the rotor hub 12 and a read/write head (not shown) adjacent the hard disk 208 for reading and writing data to and from the hard disk, do not collide.

The ring member 40 extends slightly below the lower end of the shaft 14 such that a relatively large disk-shaped chamber is formed between the lower end surface of the shaft 14 and the cover 18 that is larger than the gap between the lower surface of the ring member 40 and the cover 18. Therefore, the disk-shaped chamber formed between the lower end surface of the shaft 14 and the cover 18 functions as a reservoir for lubricant 24 thereby supplying the lubricant 24 in the event that insufficient amounts of the lubricant 24 are retained the bearings 28 and 32, thereby enabling the bearings to function for a long period of time.

An annual groove 12e is formed on the upper wall portion 12a, between the annular projection 12d and the side wall portion 12b. The portion of the upper wall portion 12a where the annular groove 12e is formed is thinner than the rest of the upper wall portion 12a. This thinner portion where the annular groove 12e is formed allows the upper wall portion 12a to deflect in order to absorb stresses that occur when the hard disk 208 is clamped by the clamping member 212 shown in FIG. 1. As a result, the portion of the upper wall portion 12a forming the thrust bearing 32 is not easily deformed thereby avoiding problems associated with an unbalanced condition.

In the above-described structure, once the stator 34 is electrically activated in a known manner, the rotor hub 12 and the shaft 14 start rotating within the annular support body 16 and the cover 18. As the rotor hub 12 rotates, the herringbone grooves 30 in the thrust bearing 32 act on the lubricant 24 retained between the lower surface of the upper wall portion 12a of the rotor hub 12 and upper surface of the annular support body 16 thereby generating hydrodynamic pressure urging the rotor hub 12 upward relative to FIG. 2A, thereby support thrust loads in one axial direction of the motor 10. Simultaneously, the herringbone grooves 26 in the radial bearing 28 acts on the lubricant 24 retained in the small gap defined between the outer surface of the shaft 14 and inner surface of the annular support body 16 thereby generating hydrodynamic pressure to support radial loads in the motor 10. Also simultaneously, the rotor hub 12 and the shaft 14 are magnetically biased toward the bracket 22 (in a downward direction) due to the offset 35 between the magnetic centers 34c and 36c of the stator 34 and rotor magnet 36 thereby counterbalancing the hydrodynamic pressure generated in the lubricant 24 in the thrust bearing 32.

Since the thrust bearing 32 is formed between the rotor hub 12 and the annular support body 16 without use of a thrust plate such as that in the prior art, the motor of the present invention can be manufactured and assembled with a high degree of accuracy utilizing a simple bearing structure. Therefore, motors according to the present invention can be produced more efficiently thereby increasing productivity. Also, since a surface of the rotor hub 12 is utilized to form the thrust bearing 32, the thrust bearing 32 assists greatly in keeping the rotor hub 12 vertical and concentric within the annular support body 16 during rotation of the rotor hub 12 thereby helping to eliminate wobble and tilting of the rotor hub 12 and shaft 14. Also since the surface of the rotor hub 12 used to form the thrust bearing 32 has a proportionately greater surface area than the conventional thrust plate, there is greater flexibility in the size, configuration and orientation of herringbone grooves of the thrust bearing. Since a thrust plate is not utilized in the thrust bearing of the present invention, rotation of the rotor hub 12 is not affected by the preciseness or tightness of tolerances between the shaft and a thrust plate. The structure of a radial bearing can also be simplified in a motor that does not have a thrust plate. As a result, the motor 10 can be made smaller, thinner, and less costly to manufacture.

Since a thrust plate is not utilized in the thrust bearing of the present invention, rotation of the rotor hub 12 is not affected by the preciseness or tightness of tolerances between the shaft and a thrust plate. The structure of a radial bearing can also be simplified in a motor that does not have a thrust plate. As a result, the motor 10 can be made smaller, thinner, and less costly to manufacture.

In the structure of the motor 10 described above, the pressure generated by the herringbone grooves 30 in the thrust bearing 32 imparts a lifting force on the rotor hub 12 and the shaft 14 that is balanced by the magnetic attraction acting between the stator 34 and the rotor magnet 36. In other words, the motor 10 does net include a conventional thrust plate and conventional thrust bearings formed on upper and lower surfaces of a thrust plate as in a conventional motor. Since members for thrust bearings formed on a thrust plate require precise manufacturing, the motor 10 of the present invention is easy to manufacture and assemble, thereby reducing production costs of a hard disk drive. As well, the configuration of the motor 10 of the present invention reduces viscous resistance of the lubricant 24 during rotation of the motor in comparison with a conventional motor where thrust bearings are formed on upper and lower surfaces of a thrust plate, thereby improving the electrical efficiency of the motor 10.

Additionally, since the annular support body 16 is made of a porous oil-bearing metal, the radial bearing 28 is provided with a vent to the air within the housing 200 through the pores and voids in the oil-bearing sintered metal material. Therefore, no air vent needs to be formed to expose the radial bearing to the outside air, which further simplifies the structure of the motor and reduces the production cost of the motor.

It should be understood that in the above described embodiment of the present invention, the herringbone grooves 26 of the radial bearing 28 are not limited, with respect to location, to the inner surface of the annular support body 16. In other words, the herringbone grooves 26 may alternatively be located on adjacent the portion of the outer surface of the shaft 14. Further, the herringbone grooves 30 in the thrust bearing 32 may alternatively be formed on the upper surface of the annular support body 16 facing the upper wall portion 12a of the rotor hub 12.

Second Embodiment

The motor 10 described above with respect to FIGS. 2A, 2B and 2C may be modified in a variety of different ways and still remain within the scope of the invention. For example, a motor 10' depicted in FIG. 2D may include generally all of the features described above with respect to FIGS. 2A, 2B and 2C except that a stator 34' and a rotor magnet 36' may alternatively be employed. All other features of the motor 10 are generally present in the motor 10' and therefore, repetitious description will not be repeated. Rather, only those features of the motor 10' that differ from the motor 10 will be described.

As mentioned above, the motor 10' shown in FIG. 2D includes the stator 34' and the rotor magnet 36' having magnetic centers axially aligned with one another. Therefore, there is no magnetic attraction acting therebetween so as to urge the rotor hub 12 in an axial direction with respect to the annular support body 16. An axial or thrust force is provided in an alternative way.

The bracket 22 is formed with an annular recess that retains a first magnet 46. The flange portion 12c is formed with a recess that retains a second magnet 44. The first and second magnets 46 and 44 are oriented such that there is a magnetic attraction force acting therebetween so as to urge the rotor hub 12 toward the bracket 22 balancing the upward lifting force that results from hydrodynamic pressure generated in the lubricant 24 in the thrust bearing 32.

Third Embodiment

Figure 3B:
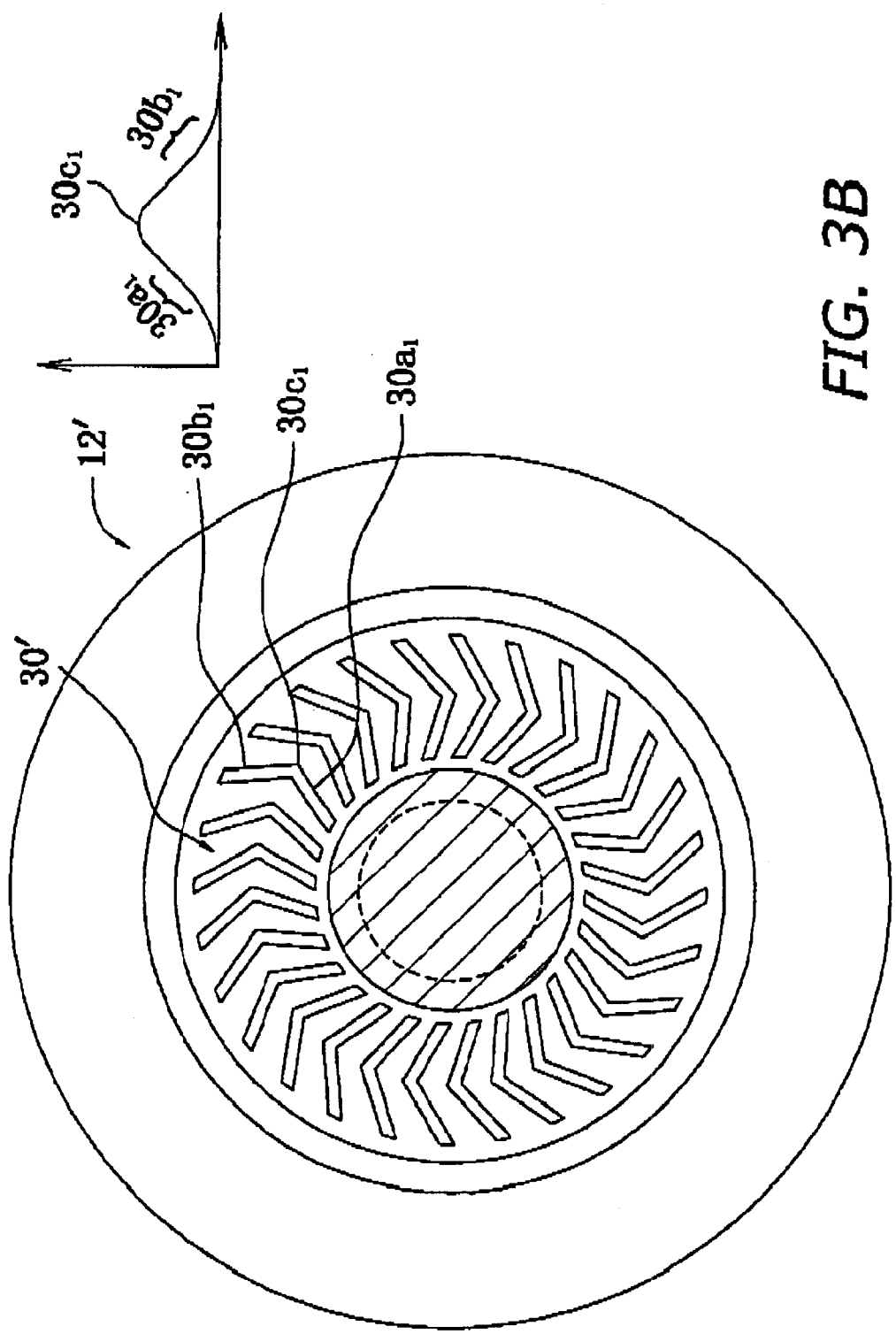
FIG. 3B is a bottom view of the rotor hub depicted in FIG. 3A showing hydrodynamic grooves formed on the rotor hub which in part form a thrust bearing of the motor.
Figure 3C:
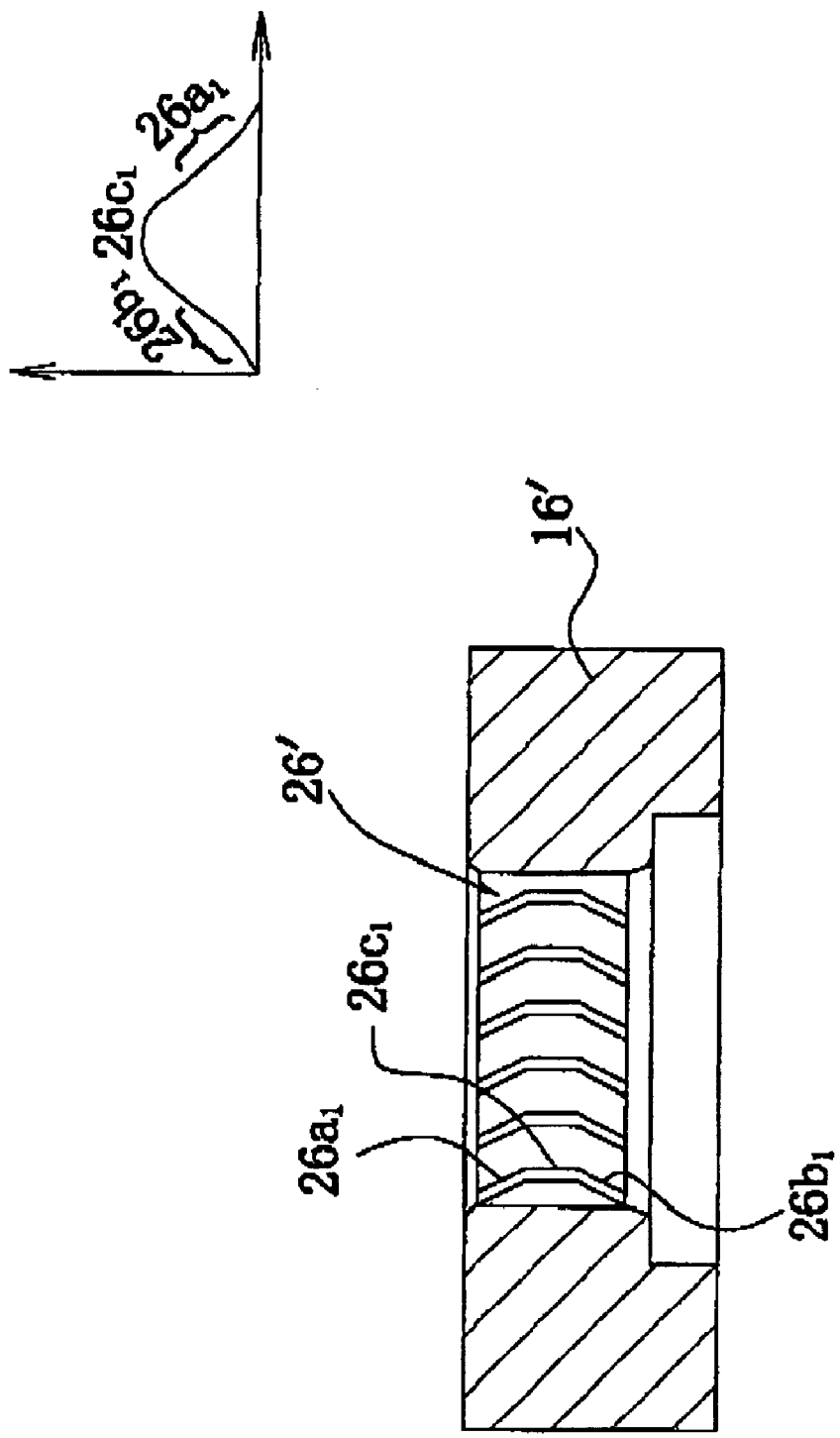
FIG. 3C is a cross-sectional side view of the stationary sleeve shown removed from the motor depicted in FIG. 3A, showing details of hydrodynamic grooves formed on an inner circumferentially extending surface of the sleeve.
Figure 3D:
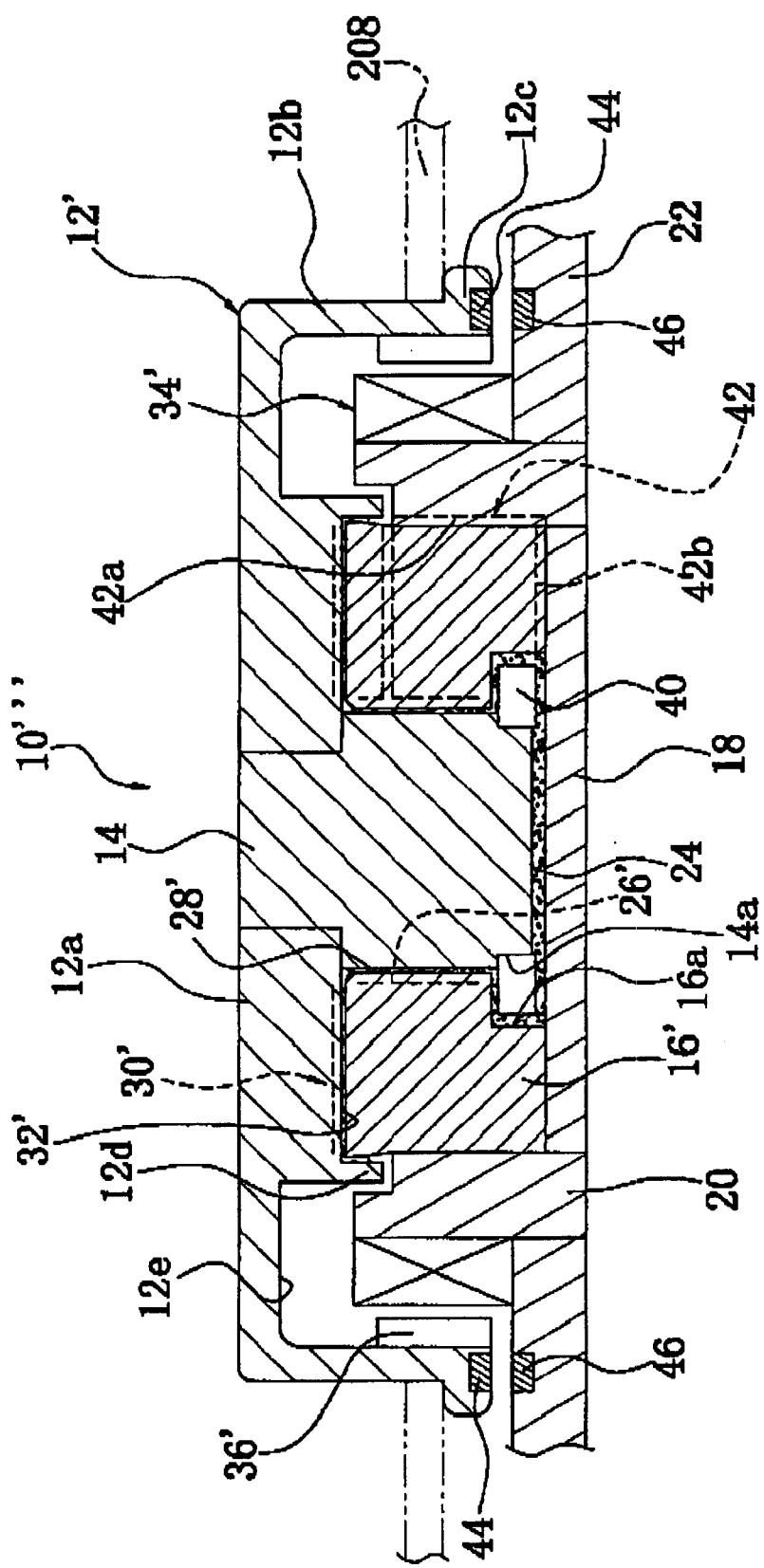
FIG. 3D is a fragmentary, cross-sectional side view similar to FIG. 3A, showing details of a motor according to a fourth embodiment of the present invention.

The motor M in FIG. 1 may also correspond to a motor 10" as shown in FIGS. 3A, 3B and 3C. As shown in FIG. 3, the motor 10" includes many of the features of the above described first embodiment. For instance, the motor 10" includes the shaft 14, the disk-shaped cover 18, the supporting cylinder 20, the bracket 22, lubricant 24, the stator 34, and the rotor magnet 36. As can be seen in FIG. 3A, the stator 34 and rotor magnet 36 further have magnetic centers 34c and 36c, respectively, which are axially offset thereby acting as a thrust bearing in a manner described above with respect to the first embodiment.

The motor 10" further includes a rotor hub 12' that is generally the same as the rotor hub 12 described above with respect to the first embodiment, but is formed with herringbone grooves 30' that differ from those in the first embodiment, as described further below. The motor 10" also includes an annular support body 16' that is generally the same as the annular support body 16 described above with respect to the first embodiment, but has been modified slightly, as is described below.

The motor 10" further includes a radial bearing 28' and a thrust bearing 32' that are located in the same relative positions as described above with respect to the first embodiment, however, the herringbone grooves in the respective bearings differ from those described in the first embodiment, as is described in greater detail below.

In the radial bearing 28', herringbone grooves 26' (FIG. 3A) are formed with spiral grooves 26a1 and 26b1 and corner portions 26c1, as shown in FIG. 3C. The spiral grooves 26a1 and 26b1 have a substantially identical axial length, and extend in opposite rotational directions. The corner portions 26c1 connect the spiral grooves 26a1 and 26b1. As the rotor hub 12 and the shaft 14 rotate, the lubricant 24 is urged along the spiral grooves 26a1 and 26b1 toward the corner portions 26c1, thereby generating hydrodynamic pressure in the lubricant 24 between the outer surface of the shaft 14 and radially inward surface of the annular support body 16'. A graph to the right of the annular support body 16' in FIG. 3C shows the pressure distribution in an axial direction along the length of the shaft 14 indicating that a high pressure area is generated in the vicinity of the corner portion 26c1.

The herringbone grooves 30' formed in the thrust bearing 32' have spiral grooves 30a1 and 30b1, and corner portions 30c1. The spiral grooves 30a1 and 30b1 have substantially identical radial lengths, and extend in opposite rotational directions. The corner portions 30c1 connect the spiral grooves 30a1 and 30b1. The lubricant 24 is urged along the spiral grooves 30a1 and 30b1 toward the corner portions 30c1 while the rotor hub 12 and the shaft 14 rotate, thereby generating hydrodynamic pressure in the lubricant 24 between the upper surface of the annular support body 16' and the adjacent portion of the lower surface of the rotor hub 12'. The graph to the right of the rotor hub 12' in FIG. 3B show the fluid pressure distribution along a radial direction of the thrust bearing 32' indicating that a high fluid pressure area is generated in the vicinity of the corner portion 30c1.

The annular support body 16' and supporting cylinder 20 of the motor 10" shown in FIG. 3A are formed with an air conduit 42 that facilitates venting of bubbles and vapor pressure present in an area near the axial lower end of the annular support body 16' where the lubricant 24 is under a lower pressure than in the radial bearing 28'. The air conduit 42 includes a first air conduit 42a and a second air conduit 42b. The first air conduit 42a extends in the axial direction along an inner surface of the supporting cylinder 20 and is open at the upper end surface of the supporting cylinder 20. The second air conduit 42b extends in the radial direction on a lower end surface of the annular support body 16' and is open to an axial lower end portion of the small gap defined between the shaft 14 and the annular support body 16 adjacent to the ring member 40. The second air conduit 42b also connects to the first air conduit 42a. Although FIG. 3A shows only one air conduit 42, the motor 10" can be provided with a plurality of circumferentially spaced apart air conduits 42.

The annular support body 16' may be made of a sintered metal material in order to provide the oil retaining properties described above with respect to the first embodiment. However, the annular support body 16' may alternatively be made of a solid metal material such as stainless steel or brass.

It should be understood that in the above described embodiment of the present invention, the grooves 26' of the radial bearing 28' are not limited, with respect to location, to the inner surface of the annular support body 16'. In other words, the grooves 26' may alternatively be located on adjacent the portion of the outer surface of the shaft 14. Further, the grooves 30' in the thrust bearing 32' may alternatively be formed on the upper surface of the annular support body 16' facing the upper wall portion 12a of the rotor hub 12'.

Fourth Embodiment

The motor 10" described above with respect to FIGS. 3A, 3B and 3C may be modified in a variety of different ways and still remain within the scope of the invention. For example, a motor 10''' depicted in FIG. 3D may include generally all of the features described above with respect to FIGS. 3A, 3B and 3C except that a stator 34' and a rotor magnet 36' may alternatively be employed in a manner previously described with respect to the second embodiment depicted in FIG. 2D. All other features of the motor 10'' of the third embodiment are generally present in the motor 10''' depicted in FIG. 3D and therefore, repetitious description will not be repeated. Rather, only those features of the motor 10''' that differ from the motor 10'' will be described.

As mentioned above, the motor 10''' shown in FIG. 3D includes the stator 34' and the rotor magnet 36' having magnetic centers axially aligned with one another. Therefore, there is no magnetic attraction acting therebetween so as to urge the rotor hub 12' in an axial direction with respect to the annular support body 16'. An axial or thrust force is provided in an alternative way.

The bracket 22 is formed with an annular recess that retains a first magnet 46. The flange portion 12c is formed with a recess that retains a second magnet 44. The first and second magnets 46 and 44 are oriented such that there is a magnetic attraction force acting therebetween so as to urge the rotor hub 12 toward the bracket 22 balancing the upward lifting force that results from hydrodynamic pressure generated in the lubricant 24 in the thrust bearing 32.

Fifth Embodiment

A fifth embodiment of the present invention is described below with reference to FIGS. 4A, 4B and 4C which show details of a disk drive motor 50. The motor 50 includes a rotor hub 52, a shaft 54, an annular support body 56, a disk-shaped cover 58, a supporting cylinder 60, a bracket 62, lubricant 64, radial bearings 70 and 72, a thrust bearing 76, a stator 78, and a rotor magnet 80, all of which have aspects similar to the motor described above with respect to the first embodiment, as described below.

The rotor hub 52 is formed with a substantially disk-shaped upper wall portion 52a, a cylindrical side wall portion 52b, and a flange portion 52c. The cylindrical side wall portion 52b extends downward from the outer periphery of the upper wall portion 52a. The flange portion 52c projects in a radially outward direction from the bottom of the outer peripheral surface of the side wall portion 52b, thereby providing a surface for supporting the hard disk 208, depicted in phantom lines in FIG. 4A. The upper end of the shaft 54 is fixedly fitted in a central bore formed in the upper wall portion 52a of the rotor hub 52, whereby the shaft 54 rotates together with the rotor hub 52.

The annular support body 56 is a hollow cylindrical member adapted to rotatably support the shaft 54, as described in greater detail below. The cover 58 is coupled to the inner periphery of a lower end of the annular support body 56. The supporting cylinder 60 supports the annular support body 56. The supporting cylinder 60 is fixed to the bracket 62.

The lubricant 64 is retained by capillary action in a small gap defined between a portion of the lower surface of the upper wall portion 52a of the rotor hub 52 and an upper surface of the annular support body 56. The lubricant 64 is further retained in the small gap as it continues in an axial direction between inner peripheral surfaces the annular support body 56 and portions of an outer surface of the shaft 54. Further, the lubricant 64 is retained in a reservoir formed at the bottom of the motor 50 between a lower end surface of the shaft 54 and an upper surface of the cover 58.

A portion of the lower surface of the upper wall portion 52a of the rotor hub 52 is formed with spiral grooves 74. The spiral grooves 74, the surrounding portions of the lower surface of the upper wall portion 52a of the rotor hub 52, the upper surfaces of the annular support body 56, and the lubricant 64 retained therebetween together define the thrust bearing 76.

Figure 4A:
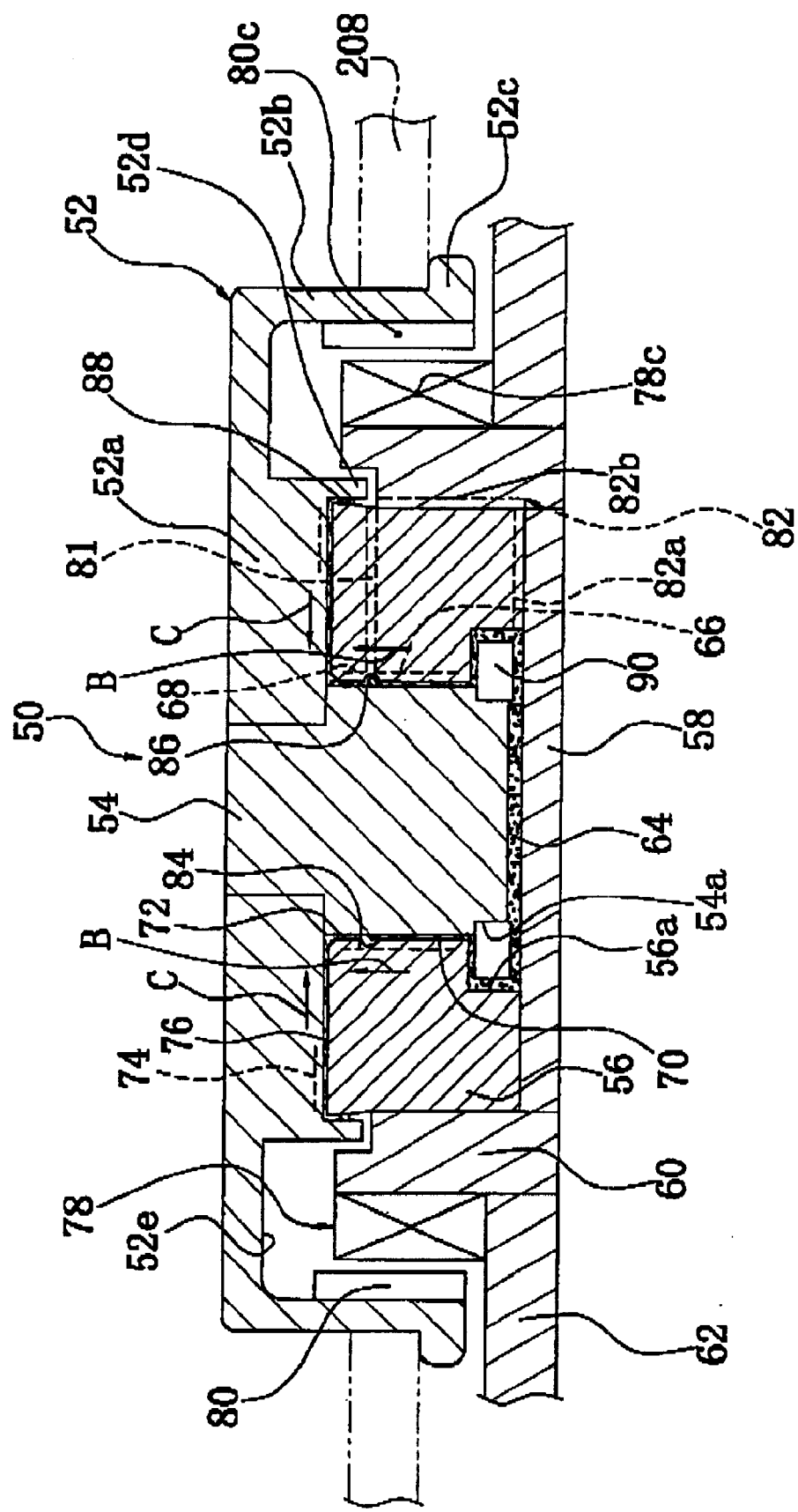
FIG. 4A is a fragmentary, cross-sectional side view of the hard disk drive depicted in FIG. 1, on an enlarged scale, showing details of a motor having a rotor hub fixed to a rotational shaft and a motor housing having a stationary sleeve according to a fifth embodiment of the present invention.
Figure 4B:
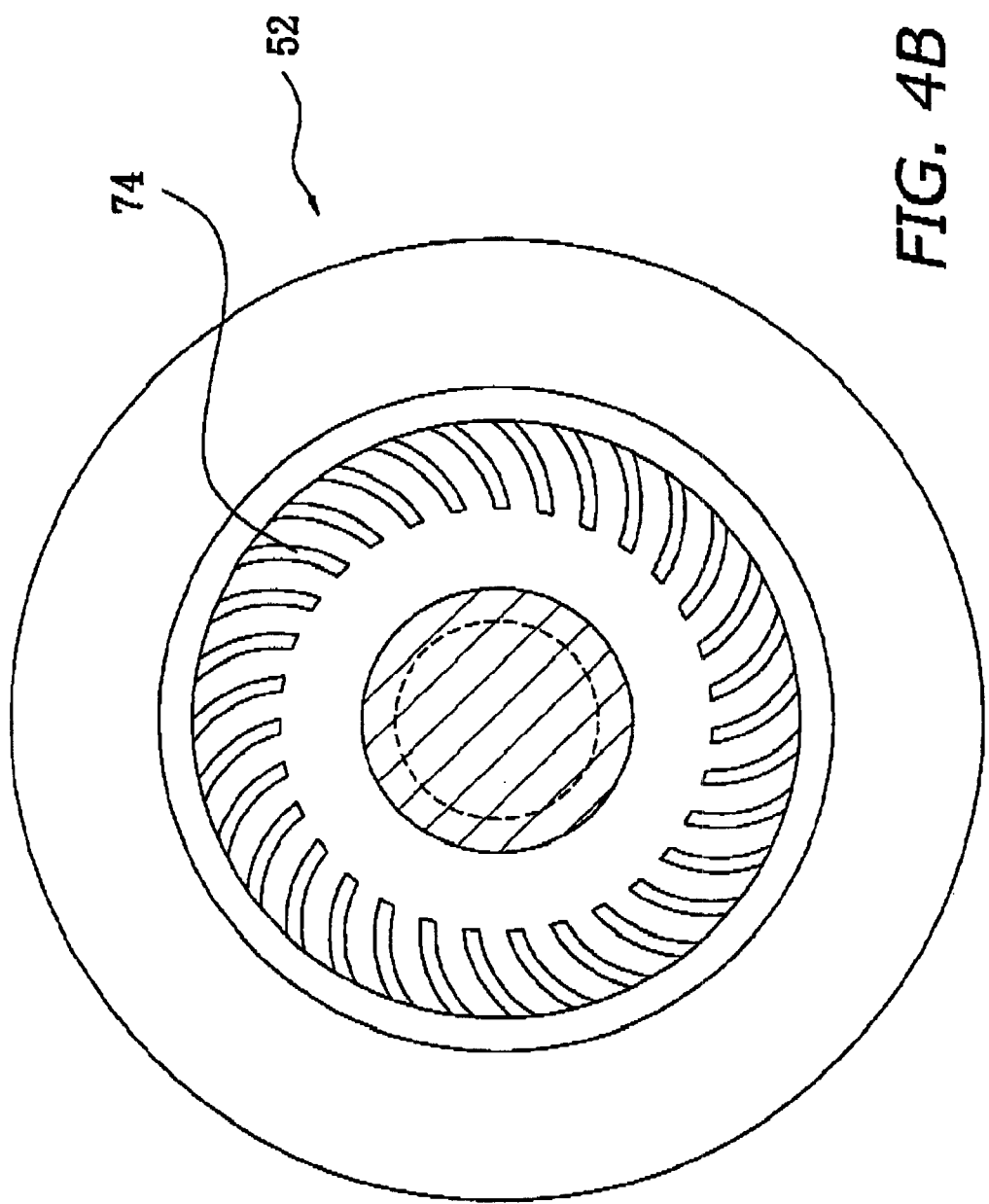
FIG. 4B is a bottom view of the rotor hub depicted in FIG. 4A showing hydrodynamic grooves formed on the rotor hub which in part form a thrust bearing of the motor.
Figure 4C:
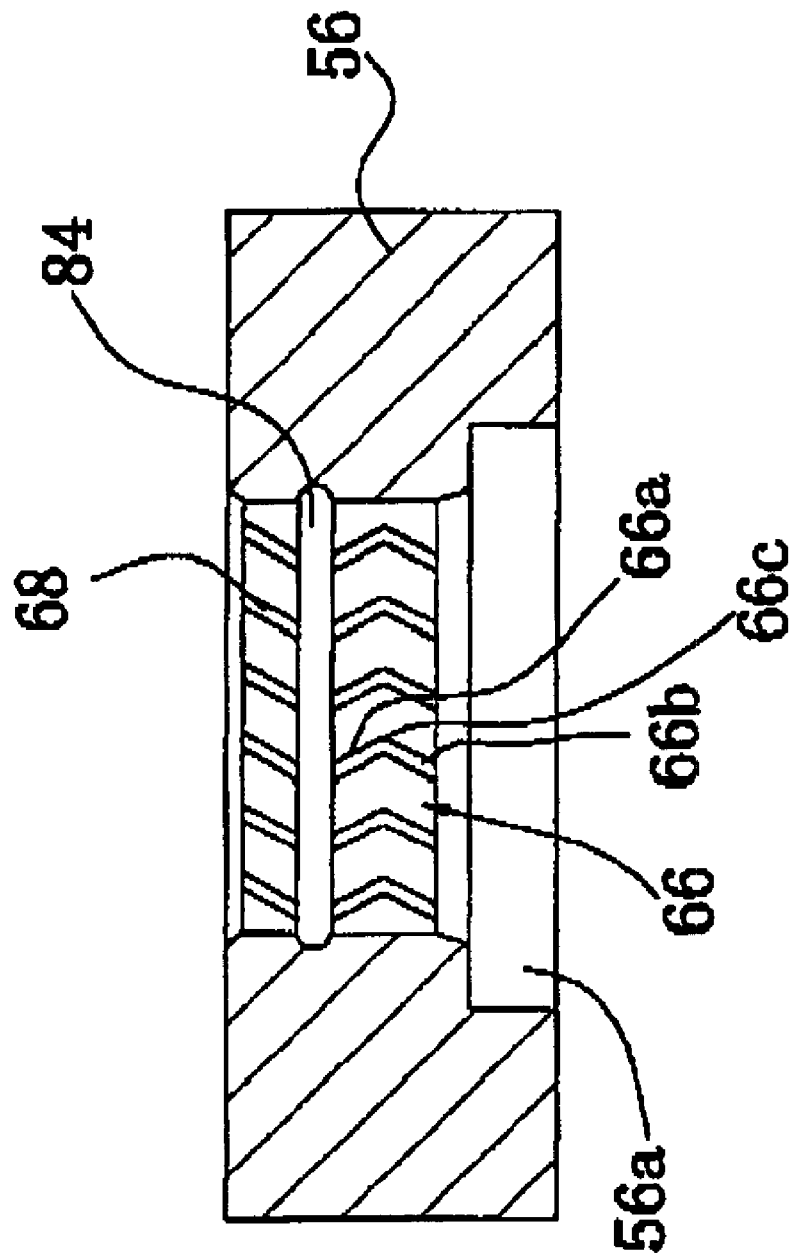
FIG. 4C is a cross-sectional side view of the stationary sleeve shown removed from the motor depicted in FIG. 4A, showing details of hydrodynamic grooves formed on an inner circumferentially extending surface of the sleeve.
Figure 4E:
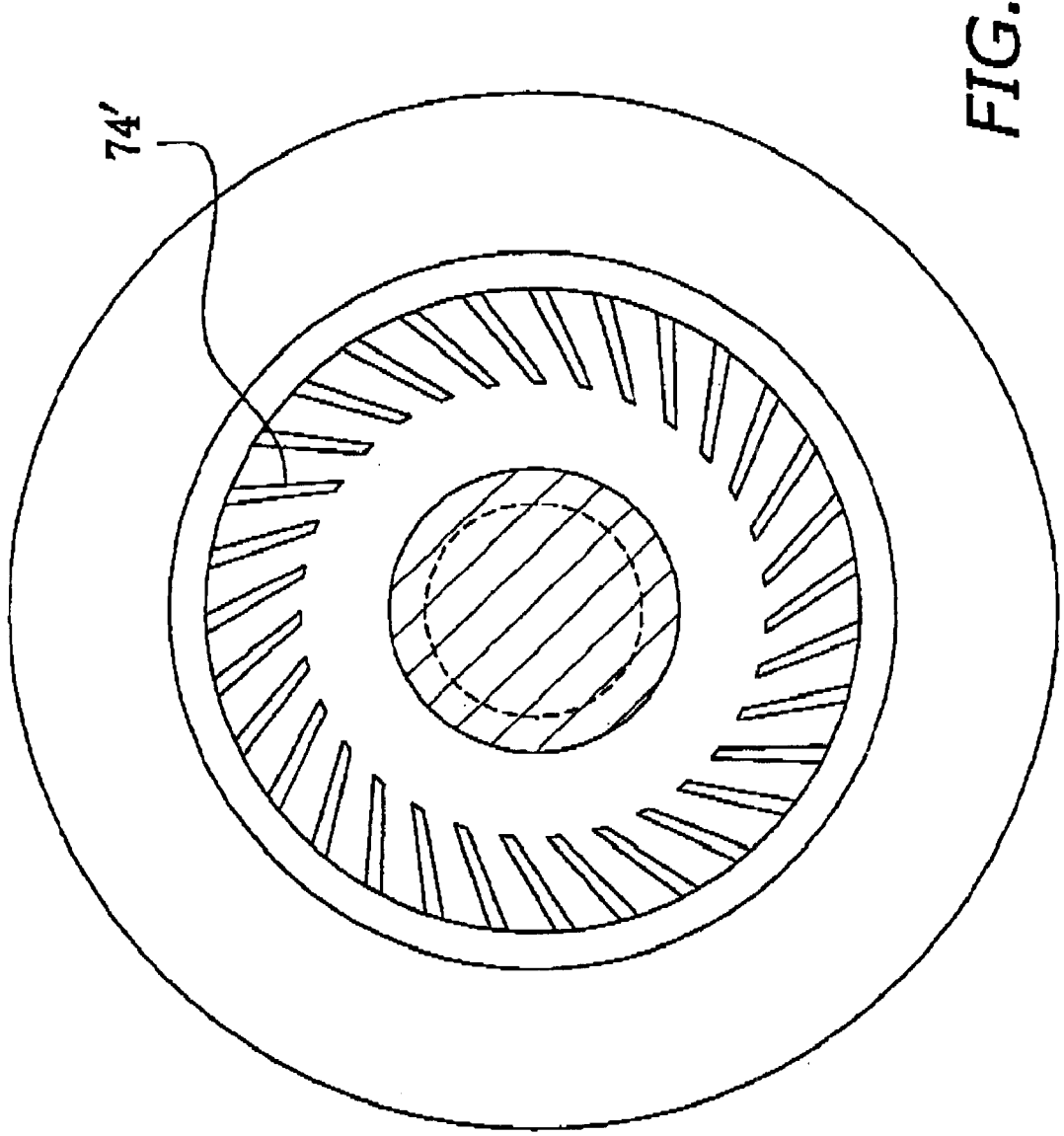
FIG. 4E is a bottom view of the rotor hub depicted in FIG. 4A showing an alternative configuration of hydrodynamic grooves formed on the rotor hub.

Spiral grooves 68 as depicted in FIG. 4C are formed in the upper portion of the inner peripheral surface of the annular support body 56. The spiral grooves 68, the surrounding inner peripheral surface of the annular support body 56, the adjacent portion of an outer surface of the shaft 54, and the lubricant 64 retained therebetween define the upper radial bearing 72.

A lower portion of the inner peripheral surface of the annular support body 56 is formed with herringbone grooves 66, also depicted in FIG. 4C. The herringbone grooves 66, the surrounding inner peripheral surface of the annular support body 56, the adjacent portion of an outer surface of the shaft 54, and the lubricant 64 retained therebetween define the lower radial bearing 70.

The lower and upper radial bearings 70 and 72 are configured to generate hydrodynamic fluid pressure to support loads in the radial direction by virtue of the grooves 66 and 68, as is described in greater detail below. The thrust bearing 76 are also configured to generate hydrodynamic fluid pressure to support loads in the axial direction by virtue of grooves 74, as is described in greater detail below.

The stator 78 is fixed to an outer periphery of the supporting cylinder 60. The rotor magnet 80 is fixedly attached to an inner peripheral surface of the side wall portion 52b of the rotor hub 52, such that the rotor magnet 80 cooperates with the stator 78 so as to rotate the rotor hub 52 and the shaft 54 within the annular support body 56 and the cover 58. Although not shown, the bracket 62 is fixedly attached to the base member 202 of the hard disk drive shown in FIG. 1.

The herringbone grooves 66 in the lower radial bearing 70 are formed with spiral grooves 66a and 66b that extend in opposite rotational directions and corner portions 66c that connect the spiral grooves 66a and 66b, as shown in FIG. 4C. As the rotor hub 52 and the shaft 54 rotate, the lubricant 64 is pumped along the spiral grooves 66a and 66b toward the corner portions 66c, thereby generating hydrodynamic fluid pressure in the lubricant 64 to support radial loads acting on the motor 50.

The spiral grooves 68 in the upper radial bearing 72 are oriented to pump lubricant 64 in an upward direction as indicated in FIG. 4A by the arrow B. The spiral grooves 74 in the thrust bearing 76 depicted in FIG. 4B is oriented to pump lubricant 64 in a radially inward direction as indicated by arrows C in FIG. 4A. The combined hydrodynamic fluid pressure generated by the spiral grooves 68 and 74 supports both radial and thrust loads in the motor 50. Specifically, the hydrodynamic pressure generated by the spiral grooves 74 in the thrust bearing 76 is sufficient to counter loads in one axial direction (thrust loads) and is sufficient to counter the hydrodynamic pressure generated by the spiral grooves 68 in the upper radial bearings 72. In other words, since the hydrodynamic pressure from each of the grooves 68 and 74 are directed toward an intersection between the upper radial bearing 72 and the thrust bearing 76, the fluid pressure generated by the grooves 68 acts to maintain the fluid pressure generated by the grooves 74 and vice verse.

The annular support body 56 is made of any of a variety of metal materials, such as copper, copper alloy, brass or stainless steel. The annular support body 56 is formed with a first bore 81 and a first air conduit 82a for venting the radial bearings 70 and 72 to the outside air within the housing 200 (FIG. 1). The first bore 81 is open to an annular recess 84 formed on the inner surface of the annular support body 56 between the upper and lower radial bearings 72 and 70. The first bore 81 is also open to a portion of the outer peripheral surface of the annular support body 56 that is exposed to the outside air within the housing 200. The annular recess 84 defines an annular air separation space 86 between the upper and lower radial bearings 72 and 70.

The first air conduit 82a extends along the bottom of the annular support body 56 and is open to the space defined between the lower end of the shaft 54 and cover 58. The first air conduit 82a is also connected to a second air conduit 82b formed in the supporting cylinder 60. The second air conduit 82b extends from the first air conduit 82a in an upward axial direction and is open to an upper surface of the supporting cylinder 60 thereby forming a second air conduit 82.

The radial bearings 70 and 72 are exposed to the outside air through the first air conduit 81 and the second air conduit 82. Bubbles that form within the lubricant 64 as the lubricant 64 is filled or injected into the motor 50 or vapor pressure and that may form while the motor rotates are vented or exhausted out of the bearings through the first air conduit 81 and the second air conduit 82. In this way, leakage of lubricant 64 out of the bearings due to vapor pressure that is produced as a result of heightened temperatures during operation of the motor is minimized.

Since the radial bearings 70 and 72 are exposed the outside air through the first and the second air conduits 81 and 82, the bubbles and vapor pressure in the lubricant 64 can be vented out of the bearings easily.

The space between the bottom surface of the shaft 54 and the upper surface of the cover 58 serves as a reservoir for lubricant. As the lubricant 64 either vaporizes, or otherwise is lost from the bearings, the lubricant contained in the reservoir replenishes the lost lubricant, whereby the bearings can function for an extended period of time.

The motor 50 includes the upper radial bearing 72 having spiral grooves 68 to generate hydrodynamic pressure in the axial upper portion of the motor, and the lower radial bearing 70 having herringbone grooves 66 to generate hydrodynamic pressure in the axial lower portion of the motor. Therefore, the radial bearings 70 and 72 can be positioned through enough axial distance to maintain necessary rigidity of the bearings, even though the axial length of the shaft 54 of the motor 50 is shorter than in prior art configurations, thereby making it possible to make a motor that is axially thinner than conventional motors.

An annular projection 52d is formed on a lower surface of the upper wall portion 52a of the rotor hub 52. A tapered seal 88 is formed at an outer peripheral portion with respect to the thrust bearing 76. The configuration of the tapered seal 88 is generally the same as the tapered seal 38 described above with respect to the first embodiment shown in FIG. 2A.

An annular recess 54a is formed in an axial lower portion of the shaft 54. A ring member 90 is attached to the annular recess 54a such that the ring member 90 extends radially outward from the outer peripheral surface of the shaft 54. An annular recess 56a is formed on a lower portion of an inner peripheral surface of the annular support body 56 that radially faces the ring member 90, such that the ring member 90 extends into to the annular recess 56a. However, the surfaces of the annular recess 56a are spaced apart from the adjacent surfaces of the ring member 90.

The ring member 90 has a larger diameter than the inner diameter of the annular support body 56 above the recess 56a. Therefore, the ring member 90 serves as a retainer that prevents the shaft 54 from slipping out of the rotor hub 52. However, the surfaces of the ring member 90 are spaced apart from the adjacent surfaces of the recess 56a by a distance sufficient to prevent the ring member 90 from serving as a bearing.

An annular groove 52e is defined under the upper wall portion 52a between the outer peripheral surface of the annular projection 52d and the side wall portion 52b, such that the portion of the upper wall portion 52a defining the annular groove 52e is thinner than the remainder of the upper wall portion 52a. The tapered sealing 88, the ring member 90 and recess 56a, the space at the lower end of the shaft 54, and the annular groove 52e all have generally the same functions as similar structure described above with respect to the first embodiment depicted in FIG. 2A.

In the above-described structure, once the stator 78 is electrically excited, the rotor hub 52 and the shaft 54 rotate with respect to the annular support body 56 and the cover 58. As the rotor hub 52 rotates, the grooves 74 of the thrust bearing 76 generate hydrodynamic pressure in the lubricant 64 imparting an upward force on the lower surface of the upper wall portion 52a of the rotor hub 52 thereby supporting the motor against axial or thrust loads. Simultaneously, the grooves 68 in the upper radial bearing 72 generate upwardly directed hydrodynamic pressure in the lubricant 64 between the surfaces of the radial bearing 72 to radially support an upper portion the shaft 54 as the shaft 54 and rotor hub 52 rotate. Further simultaneously, the grooves 66 in the lower radial bearing 70 generate hydrodynamic forces which support a lower portion of the shaft 54 as the shaft 54 rotor hub 52 rotate.

The rotor hub 52 and the shaft 54 are magnetically biased toward the bracket 62 in a downward direction to balance the upward acting hydrodynamic pressure in the thrust bearing 76. The magnetic biasing force provided by the configuration of the stator 78 and the rotor magnet 80. Specifically a magnetic center 78c of the stator 78 is axially offset from a magnetic center 80c of the rotor magnet 80. As a result, magnetic attraction acting between the stator 78 and the rotor magnet 80 urge the rotor hub 52 downward toward the bracket 62 against the upward force in the thrust bearing 76.

Since the thrust bearing 76 is formed between the rotor hub 52 and the annular support body 56 without use of a thrust plate, the structure of the bearings, which often requires precise manufacturing and assembly, is simplified. Therefore, motors according to the present invention can be produced more efficiently than more complex prior art configurations. Since the thrust bearing is formed by a portion of the lower surface of the rotor hub and a portion of the upper surface of the annular support body, it is possible to have a thrust bearing on a surface having a greater surface area than the surface area of a thrust plate such as in the prior art. Therefore, the thrust bearing of the present invention can serve to support the shaft against tilting and wobbling during rotation. The thrust bearing further maintains the shaft in an axially aligned orientation within the annular support body. As further result, the motor of the present invention can be made smaller and thinner in the axial direction than conventional motors.

Moreover, the motor 50 having the thrust bearing 76 formed between the upper wall portion 52a of the rotor hub and the upper surface of the annular support body 56, that generates hydrodynamic pressure for urging the rotor hub 52 and the shaft 54, is balanced by the magnetic attraction acting between the stator 78 and the rotor magnet 80 so as to urge the rotor hub 52 and shaft 54 downward. In other words, the motor 50 does not have a thrust plate and therefore does not have thrust bearings formed on upper and lower surfaces of the thrust plate as in a conventional motor. Rather, the magnetic attraction defines one thrust bearing. Since members for thrust bearings formed on a thrust plate require precise manufacturing techniques, the motor 50 of the present invention, which does not have such thrust plate, is easier to manufacture thereby reducing the cost of a hard disk drive.

Further, since a thrust plate is not utilized in a thrust bearing, rotation of the rotor hub 52 is not affected by the preciseness and tightness of adherence between the shaft and the thrust plate. The structure of a radial bearing can also be simplified in a motor that does not have a thrust plate. As a result, the motor 50 can be made smaller, thinner, and less costly to manufacture.

Additionally, if spiral grooves 74 are utilized in the thrust bearing 76 as dynamic pressure generation grooves, viscous resistance of the lubricant 64 during rotation of the motor 50 can be reduced, making the motor 50 even more electrically efficient.

It should be understood that in the above described embodiment of the present invention, the grooves 66 and 68 of the radial bearings 70 and 71 are not limited, with respect to location, to the inner surface of the annular support body 56. In other words, the grooves 66 and 68 may alternatively be located on adjacent the portion of the outer surface of the shaft 54. Further, the grooves 74 in the thrust bearing 76 may alternatively be formed on the upper surface of the annular support body 56 facing the upper wall portion 52a of the rotor hub 52.

Sixth Embodiment

A sixth embodiment of the present invention is depicted in FIG. 4D. The motor 50' in FIG. 4D is generally identical to the motor 50 depicted in FIG. 4A having all the same structural features elements except that the motor 50' is provided with an alternative form of magnetic attraction to provide thrust bearing support.

Specifically, the motor 50' in FIG. 4D has a stator 78' and a rotor magnet 80 having centers that are not axially offset from one another as in the first embodiment and fifth embodiment. Rather, the rotor hub 52 is formed with a recess at a radial lower and outward portion having a first magnet 144 fixed therein. Further, the bracket 62 is formed with a recess having a second magnet 146 fixed therein. Magnetic attraction acting between the first and second magnets 144 and 146 urges the rotor hub 52 downward toward the bracket 62 to balance upward forces generated by the grooves 74 in the thrust bearing 76.

It should be appreciated that in either the fifth or sixth embodiments of the present invention, the grooves 74 may have the generally curved shape as shown in FIG. 4B or the generally linear shape depicted in 4E where the grooves 74' are depicted.

Seventh Embodiment

Figure 5A:
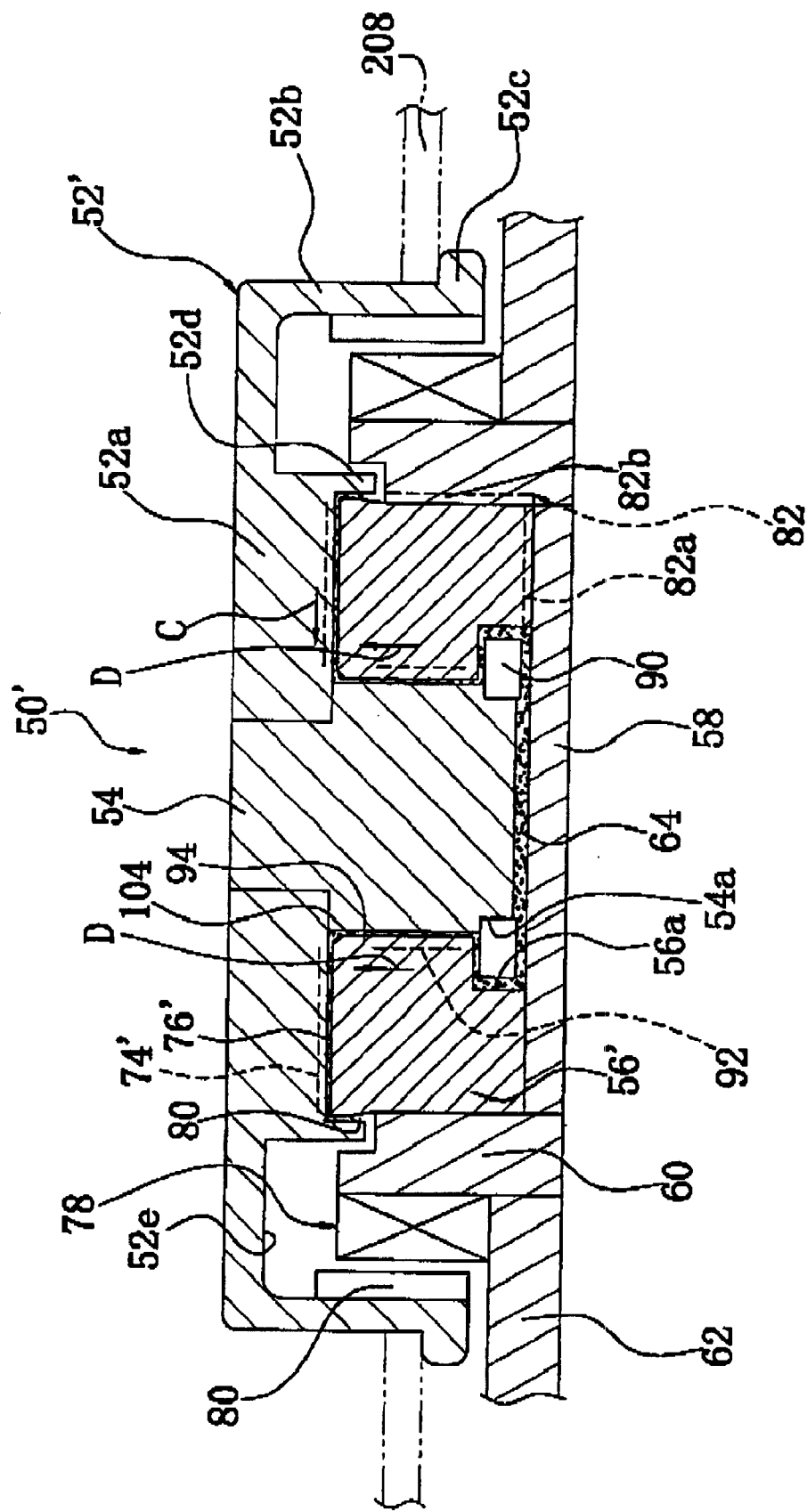
FIG. 5A is a fragmentary, cross-sectional side view of the hard disk drive depicted in FIG. 1, on an enlarged scale, showing details of a motor having a rotor hub fixed to a rotational shaft and a motor housing having a stationary sleeve according to a seventh embodiment of the present invention.
Figure 5B:
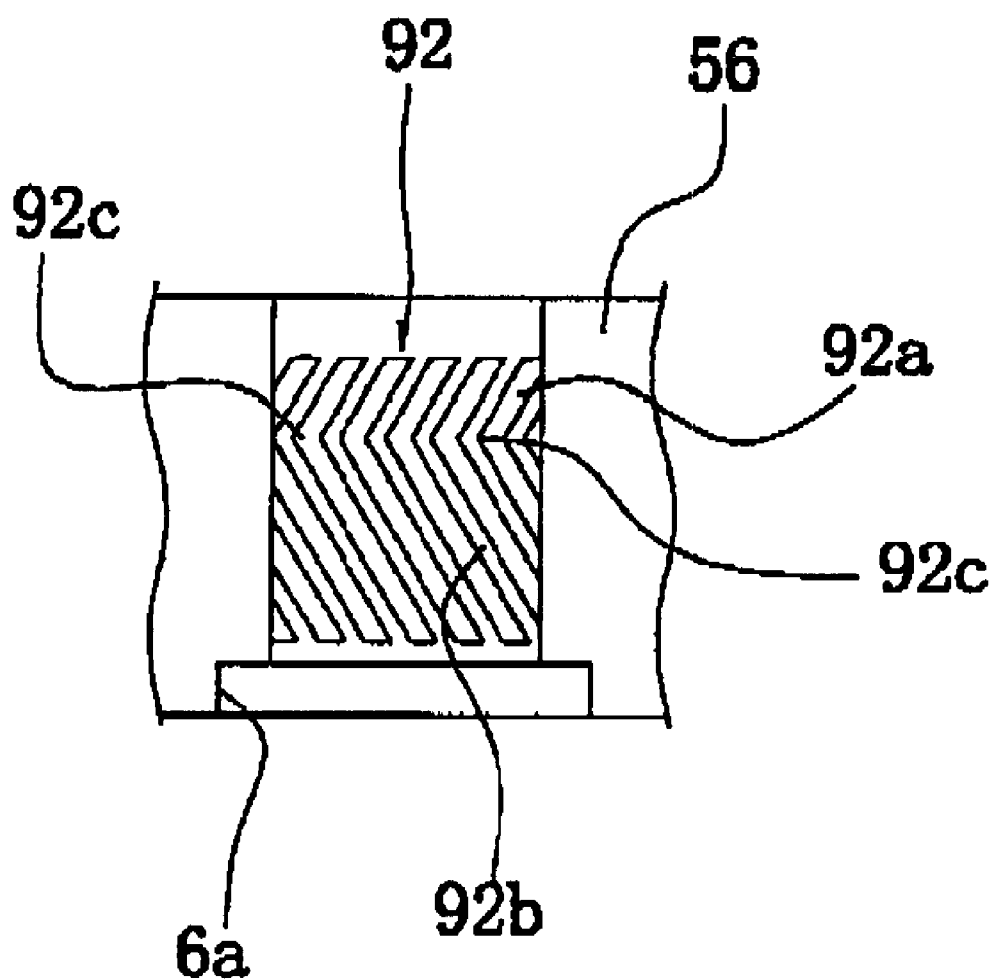
FIG. 5B is a cross-sectional side view of the stationary sleeve shown removed from the motor depicted in FIG. 5A, showing details of hydrodynamic grooves formed on an inner circumferentially extending surface of the sleeve.
Figure 5C:
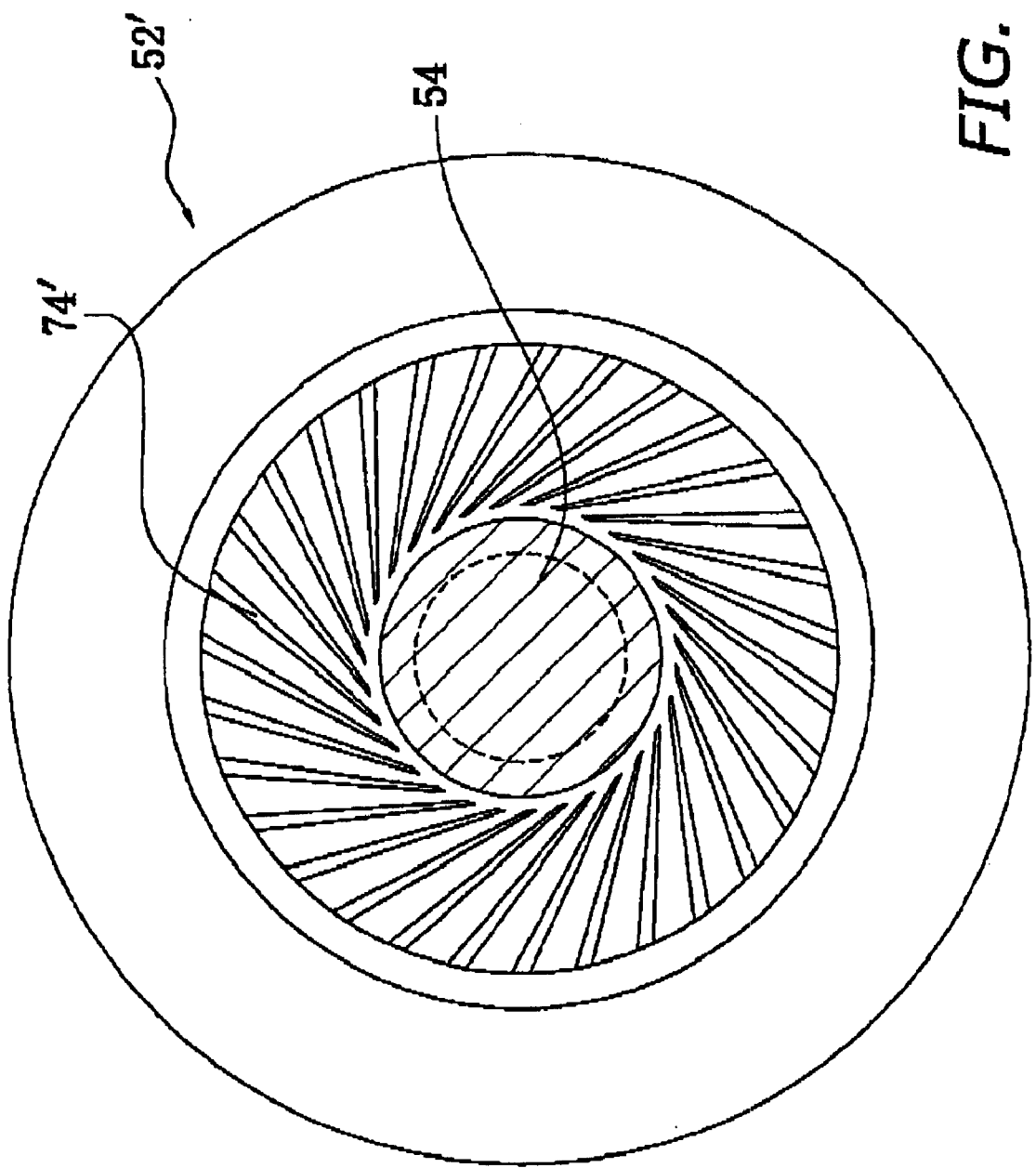
FIG. 5C is a bottom view of the rotor hub depicted in FIG. 5A showing hydrodynamic grooves formed on the rotor hub which in part form a thrust bearing of the motor.

A seventh embodiment of the present invention is shown in FIGS. 5A, 5B and 5C, where a motor 50" is depicted. The motor 50" has many of the features described above with respect to the sixth embodiment shown in FIG. 4A. For instance, the motor 50" in FIG. 5A includes the bracket 62, the supporting cylinder 60 having first and second air conduits 82a and 82b, the rotational shaft 54 and a stator 78.

The motor 50" also includes an annular support body 56' that is formed with herringbone grooves 92, described in greater detail below. The motor 50" also includes a rotor hub 52' having many of the same features as the rotor hub 52 of the sixth embodiment in FIG. 4A such as the rotor magnet 80 that is axially offset from the stator 78 to provide magnetic attraction that urges the rotor hub 52' downward toward the bracket 62 thereby acting as a thrust bearing to balance upward forces acting on the rotor hub 52' generated in the thrust bearing 76' (described in greater detail below).

However, unlike the sixth embodiment, the motor 50" only includes one radial bearing 94 that is formed by an inner surface of the annular support body 56', the herringbone grooves 92 formed on the inner surface of the annular support body 56', the outer surface of the shaft 54 adjacent to the herringbone grooves 92 and the lubricant 64 retained therebetween.

The herringbone grooves 92, as shown more clearly in FIG. 5B, include spiral grooves 92a and 92b and corner portions 92c. The spiral grooves 92a and 92b extend in opposite rotational directions and are connected to one another by the corner bent portions 92c. When the shaft 54 rotates within the annular support body 56', the herringbone grooves 92 generate hydrodynamic fluid pressure within the lubricant 64 in the radial bearing 94. The hydrodynamic fluid pressure provides support against radial loads acting on the shaft 54.

As shown in FIG. 5B, the axial length of the spiral grooves 92a is less than half the axial length of the spiral grooves 92b. Therefore, the spiral grooves 92b are able to generate a greater amount of hydrodynamic pressure in the lubricant than the spiral grooves 92a. In this way, the radial bearing 94 generates a radial load support pressure in the axial direction represented by the arrow D in FIG. 5A.

The motor 50" also includes a thrust bearing 76' that is defined by a lower surface of the portion 52a of the rotor hub 52', spiral grooves 74' formed on the lower surface of the portion 52a of the rotor hub 52', an adjacent surface of the annular support body 56' and the lubricant 64 retained therebetween. As the rotor hub 52' and the shaft 54 rotate with respect to the annular support body 56', the spiral grooves 74' shown in FIG. 5C generate hydrodynamic fluid pressure in the lubricant 64 that is directed radially inward as represented by the arrow C in FIG. 5A.

A small annular space 104 is defined adjacent to an upper portion of the shaft 54 at the intersection of the thrust bearing 76' and the radial bearing 94. Since the hydrodynamic pressure generated by the grooves 92 in the radial bearing 94 is directed upward toward the annular space 104, and the hydrodynamic pressure generated by the grooves 74' in the thrust bearing 76' is directed radially inward toward the annular space 104, the fluid pressure of the lubricant 64 in the annular space 104 is high during rotation of the motor 50".

As the motor 50" rotates, bubbles and vapor pressure are often formed in the lubricant 64 retained in the thrust bearing 76' and the radial bearing 94. Bubbles may form as a result of air being released from the lubricant. Vapor pressure may be created as lubricant vaporizes. As the bubbles and vapor pressure are generated in the lubricant 64, they tend to migrate toward portions of the lubricant 64 under low pressure. Therefore, since the annular space 104 is generally a high fluid pressure area during operation of the motor 50", bubbles and vapor pressure will tend to migrate away from the annular space 104 out of the radial bearing 94 and out of the thrust bearing 76'. Due to the hydrodynamic pressure generated by the grooves in the thrust bearing 76' and the radial bearing 94, the motor 50" shown in FIG. 5A does not need venting such as the venting provided by the annular recess 84 and vent 81 in the embodiment depicted in FIG. 4A. Further, such venting is not necessary in the motor 50" in FIG. 5A because the motor 50" only has one radial bearing 94, and also because herringbone grooves 92 and spiral grooves 74' are designed to prevent bubbles from staying in the annular space 104 due to the fluid pressure therein.

Due to the hydrodynamic pressure generated by the grooves in the thrust bearing 76' and the radial bearing 94, the motor 50" shown in FIG. 5A does not need venting such as the venting provided by the annular recess 84 and vent 81 in the embodiment depicted in FIG. 4A. Further, such venting is not necessary in the motor 50" in FIG. 5A because the motor 50" only has one radial bearing 94, and also because herringbone grooves 92 and spiral grooves 74' are designed to prevent bubbles from staying in the annular space 104 due to the fluid pressure therein.

It should be understood that in the above described embodiment of the present invention, the herringbone grooves 92 of the radial bearing 94 are not limited, with respect to location, to the inner surface of the annular support body 56'. In other words, the herringbone grooves 92 may alternatively be located on adjacent the portion of the outer surface of the shaft 54. Further, the spiral grooves 74' in the thrust bearing 76 may alternatively be formed on the upper surface of the annular support body 56' facing the upper wall portion 52a of the rotor hub 52.

Eighth Embodiment

An eighth embodiment of the present invention is depicted in FIG. 5D. A motor 50''' depicted in FIG. 5D is almost identical to the motor 50" depicted in FIG. 5A and includes all the features described with respect to the seventh embodiment except that the motor 50''' includes a stator 78' and a rotor magnet 80' that are axially aligned such that there is no magnetic attraction acting in an axial direction acting on the rotor hub 52'.

Instead, the motor 50''' in FIG. 5D includes a first annular magnet 144 mounted in a recess in the annular lip 52c of the rotor hub 52'. A second annular magnet 146 is mounted in a recess formed in the bracket 62 adjacent to the first annular magnet 144. Magnetic attraction acting between the first and second annular magnets 144 and 146 urges the rotor hub 52' downward against the upward force acting on the rotor hub 52' that results from the hydrodynamic fluid pressure generated by the spiral grooves 74' in the thrust bearing 76'. Therefore, the magnetic attraction acting between the first and second annular magnets 144 and 146 functions as a second thrust bearing.

Although the various embodiments described above are directed to motors for rotating a hard disk in a hard disk drive in which the brackets 22 and 62 of the motor are installed on the base member 202 of the hard disk drive housing, the present invention may also be applied to a hard disk drive in which the base member 202 serves the same function and has the same structure as the brackets 22 and 62 described above. Specifically, the base member 202 may be formed with an opening that supports a supporting cylinder such as the supporting cylinders 20 and 60 described above in the various embodiments of the present invention.

The foregoing description of the embodiments according to the present invention is provided for illustration only, and not for the purpose of limiting the invention as defined by the appended claims and their equivalents.

What is claimed is:

1. A disk-drive motor rotating on a hydrodynamic radial bearing and a magnetically counterbalanced single hydrodynamic thrust bearing, the motor comprising:

a shaft-support cylinder defining a central bore;

a shaft coaxially inserted into the shaft-support cylinder bore, wherein an axially extending micro-gap is defined radially between said shaft circumferentially and said bore;

a stator encompassing said shaft-support cylinder;

a rotor hub fixed to an axial end of said shaft, said rotor hub itself constituting a circular inner face opposing said shaft-support cylinder endwise wherein a radially extending micro-gap is defined axially between the circular inner face of said rotor hub and the end of said shaft-support cylinder, said rotor hub outer-circumferentially further having a cylindrical wall extending coaxially with said shaft and encompassing said stator, and a rotor magnet fixed inner-marginally to the cylindrical wall, opposing said stator;

lubricant filling the axially and radially extending micro-gaps;

a radial-hydrodynamic pressure bearing including
the axially extending micro-gap, and
hydrodynamic pressure-generating grooves formed in one surface selected from said shaft circumferentially and said bore;

a single thrust-hydrodynamic pressure bearing including
the radially extending micro-gap, and
hydrodynamic pressure generating grooves formed in one surface selected from the circular inner face of said rotor hub and the end of said shaft-support cylinder;

magnetic counterbalancing means associated with the cylindrical wall of said rotor hub for generating magnetically attractive force attracting said rotor hub axially toward said shaft-support cylinder to make the motor rotationally operable by counterbalancing thrust hydrodynamic lifting pressure acting on said rotor hub and generated in said single thrust-hydrodynamic pressure bearing when said rotor hub rotates; and a tapered seal contiguous with the radially extending micro-gap for preventing the lubricant from leaving said single thrust-hydrodynamic pressure bearing, said tapered seal being defined by
a circumferentially peripheral end portion of said shaft-support cylinder being inclined radially outward to its edge adjacent said rotor hub, and
an axially extending annular projection formed at a perimeter of the circular inner face of said rotor hub, said annular projection along an inner circumferential surface therein opposing the inclined circumferential periphery of said shaft-support cylinder end.

2. A disk-drive motor as set forth in claim 1, further comprising an annular recess formed in the shaft-support cylinder bore opposing said shaft circumferentially, and an air conduit opening in the annular recess and perforating said shaft-support cylinder to communicate the annular recess with external air, wherein an annular air separation space is formed in the axially extending micro-gap, and the radial hydrodynamic pressure bearing is formed into axially upper and lower sections on either side of said annular air separation space.

3. A hard disk drive comprising:
a housing;
a motor supported in said housing;
at least one hard disk supported on said motor, said motor being adapted to rotate said hard disk;
said motor rotating on a single hydrodynamic radial bearing and a magnetically counterbalanced single hydrodynamic thrust bearing and comprising:
   a cylindrical annular support body formed with a central bore, an inner peripheral surface of said central bore defining an inner radial surface of said support body, said support body having a first surface at a first axial end thereof;
   a rotatable shaft at least partially extending into said central bore of said support body, lubricant being retained in a gap defined between an outer peripheral surface of said shaft and said inner radial surface of said support body;
   a substantially disk-shaped rotor hub fixed to one end of said shaft, said rotor hub being adapted for supporting said hard disk, said rotor hub itself constituting an annular axial end surface that faces said first surface of said support body, said rotor hub being formed with an axially inward extending side wall at an outer periphery thereof, lubricant being retained in a gap defined between said end surface of said rotor hub and said first surface of said support body;
   a rotor magnet fixed to an inner peripheral surface of said side wall of said rotor hub;
   a stator coupled to said support body adjacent to said rotor magnet;
   a magnetic counterbalancing means for magnetically counterbalancing said rotor hub axially against hydrodynamic thrust bearing pressure lifting said rotor hub;
   wherein a radial bearing is formed by said inner radial surface of said support body, hydrodynamic pressure generating grooves formed on one surface selected from said inner radial surface of said support body and said outer peripheral surface of said shaft, and said lubricant retained in said gap defined between said inner radial surface of said support body and said outer peripheral surface of said shaft;
   wherein a single thrust hydrodynamic bearing is formed by hydrodynamic pressure generating grooves formed on one surface selected from said axial end surface of said rotor hub and said first surface of said support body, and said lubricant retained in said gap defined between said end surface of said rotor hub and said first surface of said support body, said thrust hydrodynamic bearing generating hydrodynamic lifting pressure acting axially on said rotor hub;
   wherein to make said motor rotationally operable magnetic force of said magnetic counterbalancing means axially counterbalances the hydrodynamic pressure generated by said thrust hydrodynamic bearing; and
   wherein a circumferentially peripheral end portion of said shaft-support cylinder is inclined radially outward to its edge adjacent said rotor hub, an axially extending annular projection is formed at a perimeter of the annular axial end surface of said rotor hub, and said annular projection along an inner circumferential surface opposes the inclined circumferential periphery of said shaft-support cylinder end to define a tapered seal for retaining the lubricant by capillary action.

4. The hard disk drive as set forth in claim 3, wherein said magnetic counter balancing means for magnetically counterbalancing said rotor hub comprises an axial offset between said rotor magnet and said stator such that magnetic attraction acting therebetween urges said rotor hub axially against hydrodynamic thrust bearing pressure lifting said rotor hub.

5. The hard disk drive as set forth in claim 3, wherein said magnetic counterbalancing means comprises a first magnet fixed to said rotor hub and a second magnet coupled to said support body adjacent to said first magnet such that magnetic attraction acting therebetween urges said rotor hub in said first axial direction.

6. The hard disk drive as set forth in claim 3, wherein said hydrodynamic pressure generating grooves are herringbone grooves having a V-shape and said radial bearing comprises a single hydrodynamic bearing.

7. The hard disk drive as set forth in claim 3, wherein:
   said hydrodynamic pressure generating grooves formed on said inner radial surface comprise two separate sets of grooves, a first set of grooves being herringbone grooves having a V-shape and a second set of grooves being spiral grooves, said spiral grooves being separated from said herringbone grooves by an annular recess formed on said inner surface of said support body; and
   said radial bearing comprises:
      a first hydrodynamic bearing formed by said spiral grooves, said inner radial surface of said support body surrounding where said inner radial surface surrounds said spiral grooves, said outer peripheral surface of said shaft where said outer peripheral surface is adjacent to said spiral grooves, and said lubricant retained therebetween; and
      a second hydrodynamic bearing formed by said herringbone grooves, said inner radial surface of said support body where said inner radial surface surrounds said herringbone grooves, said outer peripheral surface of said shaft where said outer peripheral surface is adjacent to said herringbone grooves, and said lubricant retained therebetween.

8. The hard disk drive as set forth in claim 7, wherein said support body is formed with at least one radially extending vent hole that communicates with said annular recess.

9. The hard disk drive as set forth in claim 3, wherein said annular support body is made of a porous oil-bearing metal.

10. The hard disk drive as set forth in claim 9, wherein said inner radial surface of said support body has said hydrodynamic pressure generating grooves, and said first surface of said support body and said inner radial surface of said support body are treated such that pores in said porous oil-bearing metal are filled.

11. The hard disk drive as set forth in claim 10, wherein said first surface of said support body and said inner radial surface of said support body are treated with a sealant material.

12. The hard disk drive as set forth in claim 3, wherein said annular support body is made of one from the group consisting of: copper, copper alloy, stainless steel and brass.

13. The hard disk drive as set forth in claim 3, further comprising:
   a cover coupled to a second axial end of said support body such that a surface of said cover and a second end of said shaft are spaced apart from one another defining a lubricant reservoir therebetween;
   said support body being formed with an annular recess proximate a second end thereof;

a ring retainer fixed to an outer periphery of said second end of said shaft, said ring retainer extending radially outward into said annular recess of said support body for preventing said shaft from slipping out of said support body.

14. The hard disk drive as set forth in claim 3, wherein:

said hard disk is fixedly fitted to said rotor hub with a clamp member; and said rotor hub includes a first annular portion and a second annular portion radially outward from said first portion, said first annular portion of said rotor hub having said hydrodynamic pressure generating grooves formed thereon, said first annular portion having a first axial thickness, said second annular portion having a second axial thickness that is smaller than said first axial thickness such that said second annular portion provides flexibility for absorbing stresses resulting from attachment of said clamping member and said hard disk, thereby preventing deformation of said first annular portion of said rotor hub.

15. A hydrodynamic pressure bearing motor rotating on a hydrodynamic radial bearing and a magnetically counterbalanced single hydrodynamic thrust bearing, the motor comprising:

a cylindrical annular support body formed with a central bore, an inner surface of said central bore defining an inner radial surface of said support body, said support body having a first surface at a first axial end thereof;

a shaft at least partially extending into said central bore of said support body and rotatably supported thereby, lubricant being retained in a gap defined between an outer peripheral surface of said shaft and said inner radial surface of said support body and hydrodynamic pressure generating grooves being formed on one of said outer peripheral surface and said inner radial surface to form a radial bearing;

a substantially disk-shaped rotor hub radially extending from one end of said shaft, lubricant being retained in a gap defined between an underside surface of said rotor hub itself and said first surface of said support body, and hydrodynamic pressure generating grooves being formed on one of said underside surface and said first surface to form a single thrust hydrodynamic bearing;

a rotor magnet fixed to said rotor hub radially outward of said single thrust hydrodynamic bearing;

a stator cooperating with said rotor magnet to cause rotation of said shaft and said rotor hub relative to said annular support body;

magnetic counterbalancing means for magnetically counterbalancing said rotor hub axially against hydrodynamic lifting pressure generated by said thrust bearing, such that said thrust bearing and said magnetic counterbalancing means cooperate to make said motor rotationally operable; and a tapered seal for preventing the lubricant from leaving said single thrust bearing, said tapered seal being defined by a circumferentially peripheral end portion of said support body being inclined radially outward to its edge adjacent said rotor hub, and an axially extending annular projection formed periametrically about said underside surface of said rotor hub, said annular projection along an inner circumferential surface therein opposing the inclined circumferential periphery of said shaft-support cylinder end.

16. The motor as set forth in claim 15 wherein said magnetic counterbalancing means comprises a first magnet fixed to said rotor hub and a second magnet coupled to said support body adjacent to said first magnet such that magnetic attraction acting therebetween urges said rotor hub in the direction opposite to the direction of the force caused by the thrust bearing.

17. The motor as set forth in claim 15, wherein said hydrodynamic pressure generating grooves formed on one of said outer peripheral surface and said inner radial surface are herringbone grooves having a V-shape and said radial bearing comprises a single hydrodynamic bearing.

18. The motor as set forth in claim 16, wherein:

said hydrodynamic pressure generating grooves formed on said inner radial surface comprise two separate sets of grooves, a first set of grooves being herringbone grooves having a V-shape and a second set of grooves being spiral grooves, said spiral grooves being separated from said herringbone grooves by an annular recess formed on said inner surface of said support body; and said radial bearing comprises:

first hydrodynamic bearing formed by said spiral grooves, said inner radial surface of said support body where said inner radial surface surrounds said spiral grooves, said outer peripheral surface of said shaft where said outer peripheral surface is adjacent to said spiral grooves, and said lubricant retained therebetween; and a second hydrodynamic bearing formed by said herringbone grooves, said inner radial surface of said support body where said inner radial surface surrounds said herringbone grooves, said outer peripheral surface of said shaft where said outer peripheral surface is adjacent to said herringbone grooves, and said lubricant retained therebetween.

19. The motor as set forth in claim 18, wherein said support body is formed with at least one radially extending vent hole that communicates with said annular recess.

20. The motor as set forth in claim 15, wherein said annular support body is made of a porous oil-bearing material.

21. The motor as set forth in claim 20, wherein said inner radial surface of said support body has said hydrodynamic pressure generating grooves, and said first surface of said support body and said inner radial surface of said support body are treated such that pores in said porous oil-bearing metal are filled.

22. The motor as set forth in claim 21, wherein said first surface of said support body and said inner radial surface of said support body are treated with a sealant material.

23. The motor as set forth in claim 15, wherein said annular support body is made of one of a group consisting of: copper, copper alloy, stainless steel and brass.

24. The motor as set forth in claim 15, further comprising:

a cover coupled to a second axial end of said support body such that a surface of said cover and a second end of said shaft are spaced apart from one another defining a lubricant reservoir therebetween;

said support body being formed with an annular recess proximate a second end thereof;

a ring retainer fixed to an outer periphery of said second end of said shaft, said ring retainer extending radially outward into said annular recess of said support body for preventing said shaft from slipping out of said support body.

25. The motor as set forth in claim 15, wherein:

a hard disk is fixedly fitted to said rotor hub with a clamp member; and said rotor hub includes a first annular portion and a second annular portion radially outward from said first portion, said first annular portion of said rotor hub having said hydrodynamic pressure generating grooves formed thereon, said first annular portion having a first axial thickness, said second annular portion having a second axial thickness that is smaller than said first axial thickness such that said second annular portion provides flexibility for absorbing stresses resulting from attachment of said clamping member and the hard disk, thereby preventing deformation of said first annular portion of said rotor hub.

26. The motor as set forth in claim 15, wherein said balancing means comprises an axial offset between said rotor magnet and said stator such that magnetic attraction acting therebetween urges said rotor hub in the direction opposite to the direction of the force caused by the thrust bearing.

27. The motor as set forth in claim 15, wherein said magnetic counterbalancing means comprises a first magnet fixed to said rotor hub and a second magnet coupled to said support body adjacent to said first magnet such that magnetic attraction acting therebetween urges said rotor hub in the direction opposite to the direction of the force caused by the thrust bearing.

28. A disk-drive motor rotationally counterbalanced in axially opposed, rotor-hub lifting and rotor-hub depressing thrust-bearing directions, the motor comprising;

a shaft-support cylinder defining a central bore;

a shaft coaxially inserted into the shaft-support cylinder bore, wherein an axially extending micro-gap is defined radially between said shaft circumferentially and said bore;

a stator encompassing said shaft-support cylinder, a rotor hub fixed axially endwise to said shaft and disposed immediately adjacent one axial end of said shaft-support cylinder, said rotor hub having a circular underside extending in a single plane radially from said shaft beyond the outermost perimeter of the adjacent end of said shaft-support cylinder, wherein a radially extending micro-gap is defined axially between the circular underside of said rotor hub and the adjacent end of said shaft-support cylinder, said rotor hub outer air cumferentially further having a cylindrical wall extending coaxially with said shaft and encompassing said stator, and a rotor magnet fixed inner-marginally to the cylindrical wall, opposing said stator;

lubricant filling the axially and radially extending micro-gaps;

a radial-hydrodynamic pressure bearing including
the axially extending micro-gap, and
hydrodynamic pressure-generating grooves formed in one surface selected from said shaft circumferentially and said bore;

one and only one hydrodynamic thrust bearing for generating thrust hydrodynamic lifting pressure acting axially on said rotor hub, said hydrodynamic thrust bearing consisting essentially of
the radially extending micro-gap, and
hydrodynamic pressure-generating grooves formed in one surface selected from the circular underside of said rotor hub and the adjacent end of said shaft-support cylinder;

magnetic thrust-bearing means associated with the cylindrical wall of said rotor hub for generating magnetically attractive force attracting said rotor hub axially in the rotor-hub depressing direction toward said shaft-support cylinder, thereby to counterbalance the thrust hydrodynamic rotor-hub lifting pressure generated in said one and only one thrust-hydrodynamic pressure bearing when said rotor hub rotates, wherein thrust bearing force acting in the rotor-hub depressing direction is generated magnetically, not hydrodynamically, in the motor; and a tapered seal contiguous with the radially extending micro-gap for preventing the lubricant from leaving said single thrust-hydrodynamic pressure bearing, said tapered seal being defined by
a circumferentially peripheral end portion of said shaft-support cylinder being inclined radially outward to its edge adjacent said rotor hub, and
an axially extending annular projection formed at a perimeter of the circular inner face of said rotor hub, said annular projection along an inner circumferential surface therein opposing the inclined circumferential periphery of said shaft-support cylinder end.

* * * * *